(12) United States Patent
Holder et al.

(10) Patent No.: US 6,672,843 B1
(45) Date of Patent: Jan. 6, 2004

(54) DUAL PUMP APPARATUS COMPRISING DUAL DRIVE SHAFTS AND AUXILIARY PUMP

(75) Inventors: Lonnie E. Holder, Sullivan, IL (US); Michael Todd, Sullivan, IL (US); Robert E. Trimble, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 3 days.

(21) Appl. No.: 10/118,263

(22) Filed: Apr. 8, 2002

(51) Int. Cl.⁷ ............................................... F04B 23/14
(52) U.S. Cl. .................. 417/201; 417/206; 91/499; 60/456; 60/486
(58) Field of Search .................. 417/199.1, 269, 417/201, 206, 362, 234; 91/499; 60/456, 464, 486, 488

(56) References Cited

U.S. PATENT DOCUMENTS

| | | | |
|---|---|---|---|
| 3,593,519 A | * 7/1971 | Fuhrimann | .................... 60/382 |
| 3,659,419 A | * 5/1972 | Ikeda | .......................... 60/405 |
| 3,680,312 A | 8/1972 | Forster | |
| 4,111,003 A | * 9/1978 | Bolinger et al. | .............. 60/469 |
| 4,252,508 A | 2/1981 | Forster | |
| 4,920,733 A | * 5/1990 | Berrios | ........................ 56/10.9 |
| 5,207,060 A | 5/1993 | Sheets | |
| 5,419,130 A | * 5/1995 | Ruckgauer et al. | ........... 60/456 |
| 5,498,140 A | 3/1996 | Kawaguchi et al. | ...... 417/199.1 |
| 5,501,578 A | 3/1996 | Skirde | |
| 5,800,134 A | 9/1998 | Hasegawa et al. | |
| 5,957,229 A | 9/1999 | Ishii | |
| 6,332,393 B1 | 12/2001 | Trimble | ....................... 92/12.2 |
| 6,361,282 B1 | 3/2002 | Wanschura | |
| 6,425,244 B1 | * 7/2002 | Ohashi et al. | ................. 60/464 |
| 6,487,856 B1 | * 12/2002 | Ohashi et al. | ................. 60/464 |

FOREIGN PATENT DOCUMENTS

| | | |
|---|---|---|
| JP | 2-135765 | 11/1990 |
| JP | 2000-9023 | 1/2000 |
| JP | 2000-009023 | 11/2000 |
| JP | 2001-146951 | 5/2001 |
| JP | 2001-263259 | 9/2001 |

* cited by examiner

*Primary Examiner*—Justine R. Yu
*Assistant Examiner*—Emmanuel Sayer
(74) *Attorney, Agent, or Firm*—Neal, Gerber & Eisenberg LLP

(57) ABSTRACT

A dual pump apparatus for use on a vehicle or industrial application having a housing in which a pair of hydraulic pumps are mounted, having by at least one charge pump mounted on an end cap, and the trunnion arms for controlling the hydraulic pumps extending out of opposite sides of the housing. A cooling fan may be mounted on the primary or secondary input shaft on the opposite side of the pulley used to engage the prime mover. An auxiliary pump may also be mounted on the primary input shaft and may be located either at the input end thereof adjacent to the pulley, or on the opposite side of the housing.

16 Claims, 26 Drawing Sheets

FIG. II

DUAL PUMP APPARATUS COMPRISING DUAL DRIVE SHAFTS AND AUXILIARY PUMP

BACKGROUND OF THE INVENTION

This application relates in general to hydrostatic transmissions and in particular to a dual pump arrangement. Hydrostatic pumps are well-known for use in driving vehicles such as tractors and other off-road devices. Such pumps are also used in a wide variety of industrial applications other than vehicles.

In one known arrangement for a vehicle, a plurality of pumps are mounted in separate housings on a vehicle frame. The pumps are each connected to a respective hydrostatic motor through high pressure hoses, which are often connected to end caps. The end cap is secured to the pump housing and includes a running surface for the pump and porting to connect the pump to the hoses.

A control arm is engaged to each hydrostatic pump to control the output of the pump. In a known design, the hydrostatic pump is of an axial piston design and the control arm is engaged to a swash plate, the rotation of which can change the output of the pump from forward to neutral to reverse. Rotation of the pumps is provided by rotary input shafts which are separately driven by the vehicle engine by pulleys and belts or other known methods. The pump transmits hydraulic fluid through one of a pair of high pressure hoses to a hydrostatic motor. Rotational output of the motor is then transmitted to the vehicle drive wheels through an output axle or other known means.

Such an arrangement allows for zero turn capability, since the hydrostatic pumps may be operated independently of one another. However, there is a cost involved with this arrangement, as it requires at least four separate housings for the individual pumps and motors, and each housing must be individually secured to the vehicle frame.

Another known hydrostatic transmission is the BDU transmission. This hydrostatic transmission comprises a single housing enclosing both a hydrostatic pump and a hydrostatic motor, both of which are mounted to a single plate. The pump input shaft and motor output shaft are parallel to one another, and the plate contains hydraulic porting to connect the pump and motor. One such hydrostatic transmission is shown in U.S. Pat. No. 5,392,670. Such an HST is generally used to connect to a drive train for powering output axles of a tractor or similar vehicle.

SUMMARY OF THE INVENTION

It is an object of this invention to provide a lower cost hydrostatic pump design that can be used in, e.g., a zero turn vehicle, or in industrial applications. This invention in the preferred embodiment uses a dual pump design having two pumps mounted in a side-by-side arrangement within a single housing. The housing can include an end cap or plate having hydraulic porting therein. High pressure hoses engaged to the end cap or plate are then connected to a plurality of hydrostatic motors engaged to vehicle drive wheels. Control arms can, be mounted on various locations on the common housing to independently control the pumps.

A benefit of this design is that it eliminates the need for separate housings for the two pumps, and reduces the number of mounting points required on the vehicle. A further advantage is that it eliminates the need for separate drive inputs for the two pumps. In the preferred embodiment, a single input shaft drives both pumps. This input shaft could directly drive one pump and be engaged to and drive a second input shaft for the second pump through gearing which could be either internal or external to the common pump housing. A benefit of this arrangement is reduced cost and size, and the ability to maintain both pumps at a constant speed.

A key feature of this design is the flexibility it affords to the user of the apparatus. For example, with minimal design changes, one or more charge pumps and/or auxiliary pumps may be attached to the primary input shaft or the secondary input shaft as needed to provide charge fluid to the hydraulic circuit or to power additional units, such as mowers, deck lifts, as may be needed.

A further benefit of this design is the ability to use an input shaft having a varying diameter, which permits the use of, among other things, a more substantial auxiliary pump on this shaft. Another benefit is the location of the two trunnion arms to operate the pump swash plates on opposite sides of the pump housing, corresponding to the sides of the vehicle, to avoid clearance problems and to simplify connection of the trunnions to the control mechanism of the vehicle. Prior art designs have the trunnions extending from one side, corresponding to the front or back of the vehicle, which thus requires additional linkages to turn the controls 90 degrees. A further benefit is the use of a single bypass valve for both pumps and the location of this valve on the side of the housing which is different from the mounting of the two trunnion arms.

While the preferred embodiment uses a single pump cavity inside the housing to mount both of the pumps, it is possible to use separate cavities to independently mount the pumps, which would permit varying pressures to be used for industrial applications and other uses where such different pressures may be important.

Another benefit of this design is the ability to locate a cooling fan on the top of the unit, with the drive input or primary input shaft entering from the bottom of the unit. This design protects the cooling fan from debris that may be kicked up during operation at the bottom of the unit. One could also use a return to neutral mechanism with this design in a known manner, such as that described and shown in co-pending application Ser. No. 09/789,419 entitled "Zero-Turn Transaxle with Mounted Return to Neutral Mechanism," the terms of which are incorporated herein by reference.

Additional benefits and objects of this invention will be apparent to those of skill in the art from a review of the following description and the drawings.

DETAILED DESCRIPTION OF THE DRAWINGS

The following is a description of the multiple embodiments of this invention. Where appropriate, like numerals indicate identical or substantially identical components, and similar numerals with a different initial numeral indicate similar components with certain differences as specified.

Figure 1:
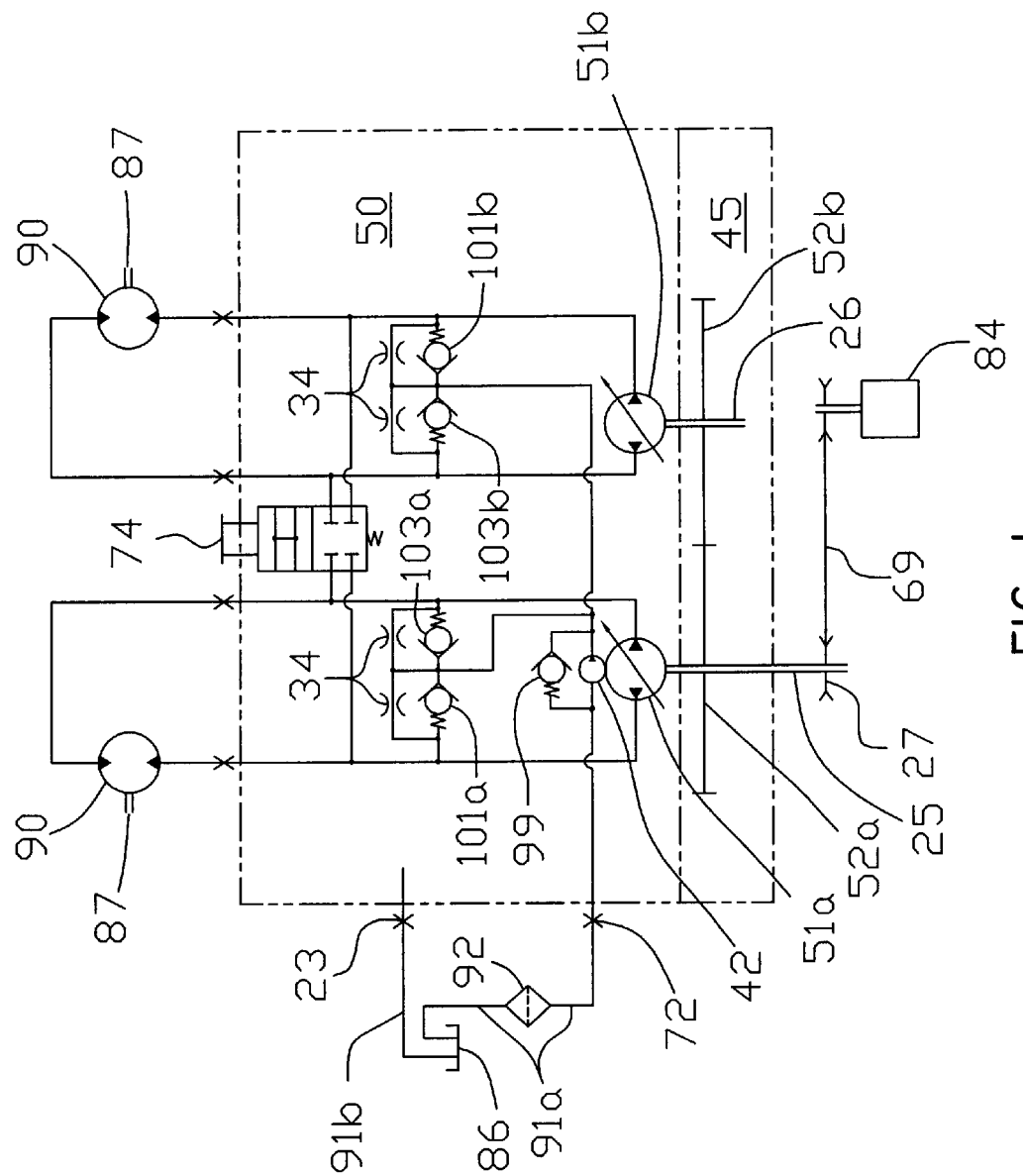
FIG. 1 is a hydraulic schematic of a first embodiment of the present invention.

The hydraulic schematic of a first embodiment of this dual pump unit 10 of the present invention is shown in FIG. 1, while the external structure thereof is shown in FIGS. 2–5. The internal structure of dual pump unit 10 of this invention is shown in FIG. 6. While this view is a cross sectional view, certain elements such as end cap 30, input shaft 25, spur gears 52a and 52b, and others are not shown in cross-section for purposes of clarity. In addition, while one pump 51a is shown in FIG. 6, the other pump 51b is not shown merely for purposes of clarity. The hydraulic porting of end cap 30 is shown in FIG. 7. It will be understood that the drawings are not to scale, and the arrangement and sizing of the components will be obvious to a person of skill in the art.

The size of pumps 51a and 51b and the other components will be dictated primarily by the intended applications of the unit and any required external dimensions.

Inside of housing 20 is located a pump chamber (or cavity) 50 in which are mounted first rotatable pump 51a and a second pump 51b, both of which are rotatably mounted on running surface 31 on end cap 30. End cap 30 is secured to housing 20 by means of a plurality of screws 32 and acts in this design to close off the pump chamber 50. The following discussion of pump 51a will also apply to the second pump 51b which is not depicted in FIG. 6 merely for purposes of clarity, but is shown in the schematic of the system shown in FIG. 1. Pump 51a is of the axial piston design and comprises rotatable cylinder block 53, in which are mounted a plurality of axial stick pistons 55, each of which includes a piston spring 56 therein, with cylinder block 53 engaged to first input shaft 25 by means of spline 44 or similar means. Pistons 55 abut a thrust bearing 47 mounted in swash plate 48. Trunnion arm 21a interfaces with swashplate 48 through slider bearing 49. Rotation of trunnion arm 21a thus moves swash plate 48 and will control the direction and flow rate of the output of hydraulic pump 51a. End cap 30 is preferably made of aluminum, and pump 51a runs on a valve plate 57 mounted on running surface 31 of end cap 30. Other materials such as cast iron could also be used. Strengthening ribs 46 are also formed on running surface 31 to provide additional support, although neither ribs 46 nor valve plate 57 are necessarily required.

Figure 2:
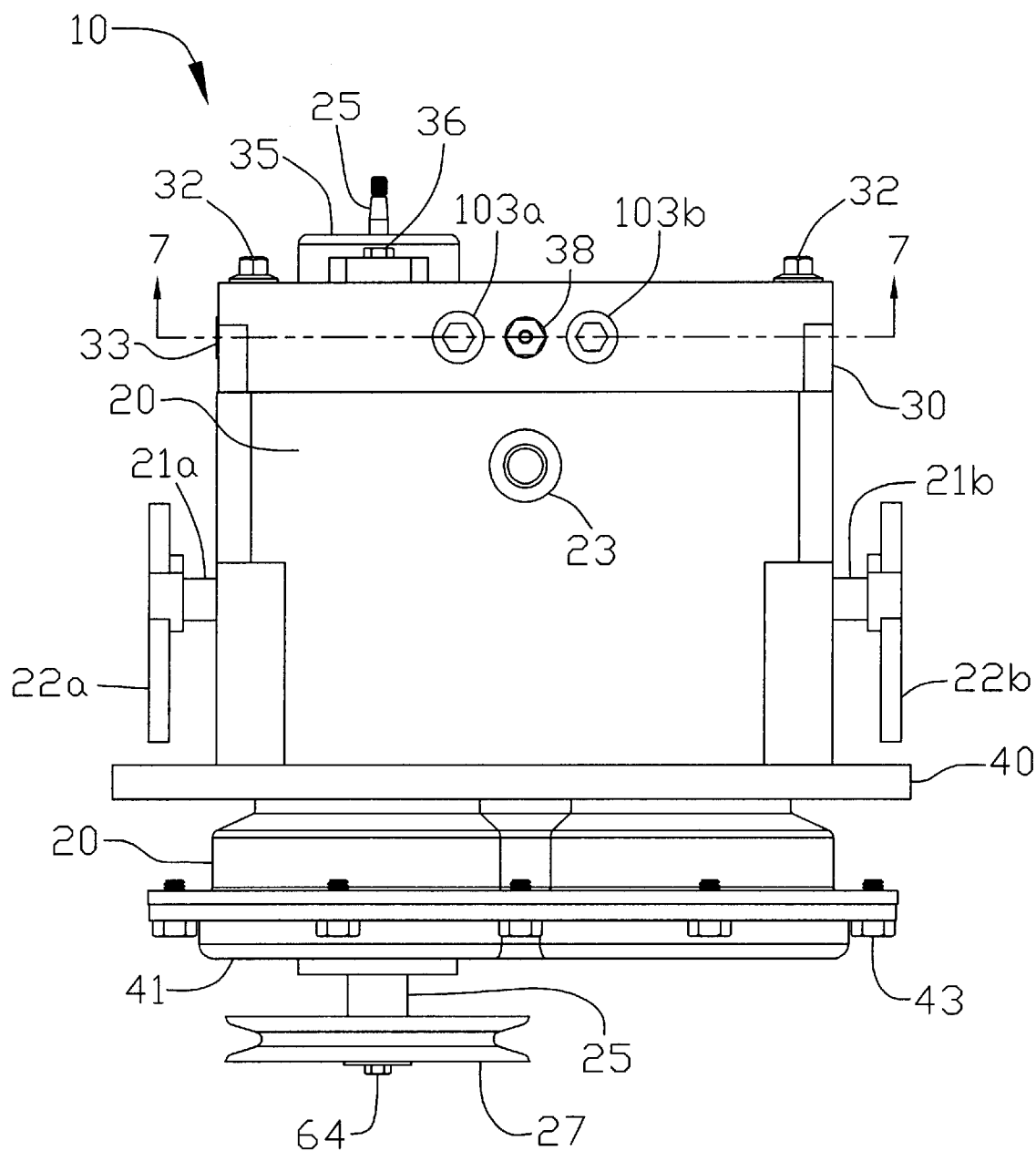
FIG. 2 is a side view of the external casing of a first embodiment of this invention.
Figure 3:
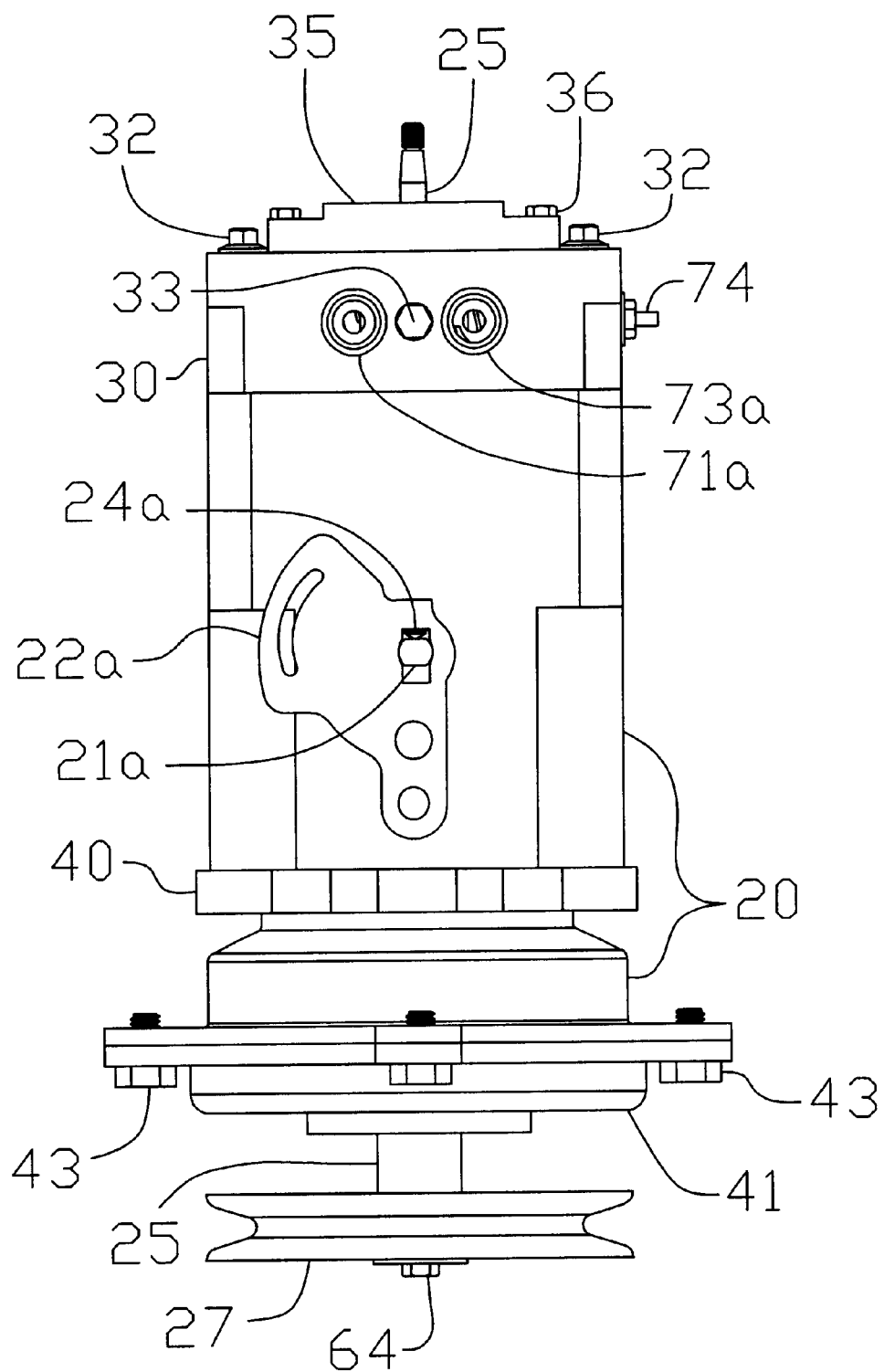
FIG. 3 is an end view of the dual pump design shown in FIG. 2.
Figure 4:
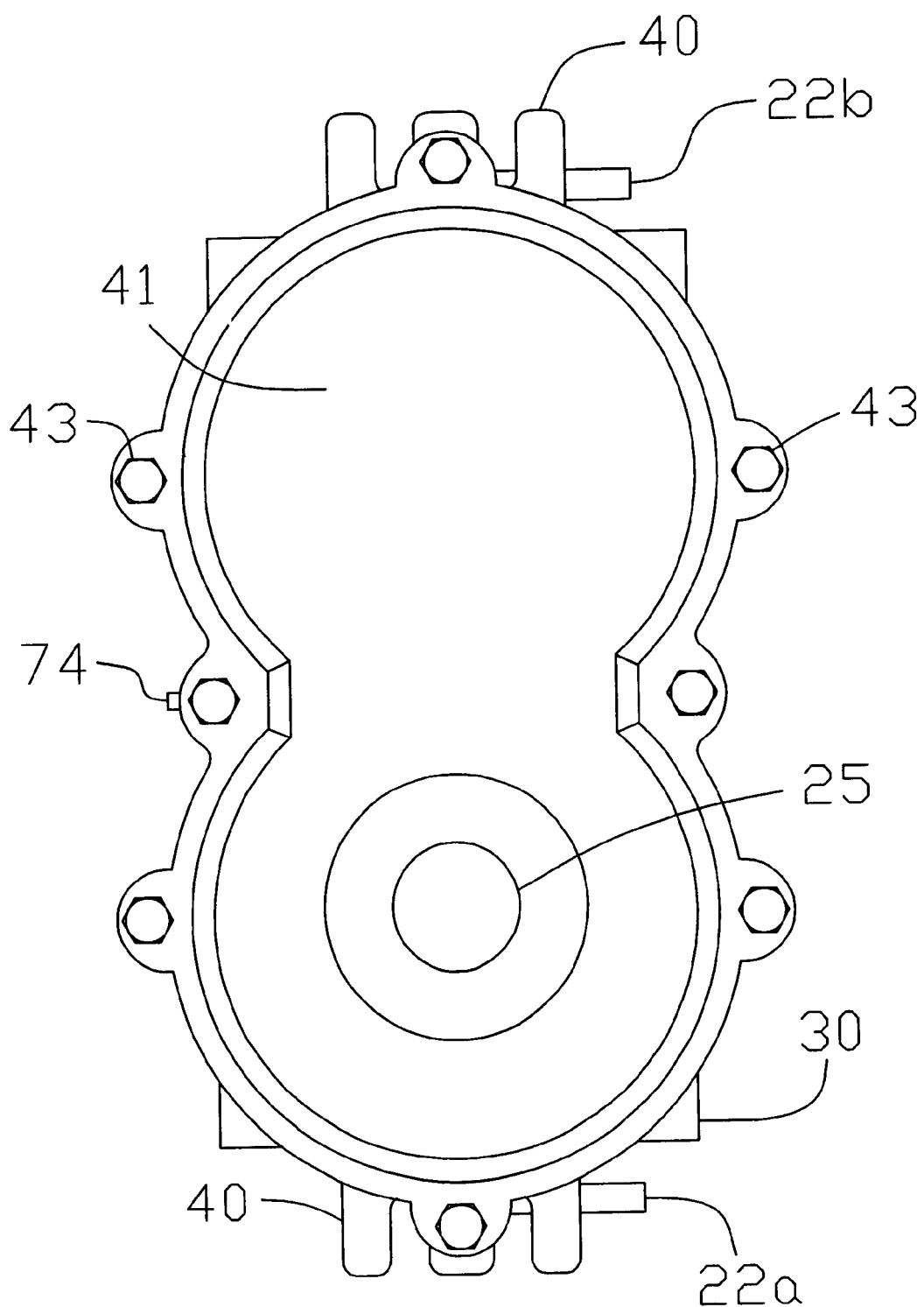
FIG. 4 is a bottom view of the dual pump design shown in FIG. 2, without the input pulley shown for clarity.

Trunnion arm 21a extends out of housing 20 through seal 58 and bushing 59. As shown in FIGS. 2 and 3, the two trunnion arms 21a and 21b are mounted to separate control arms 22a and 22b with set screws 24a and 24b. Control arms 22a and 22b car be engaged to various linkage mechanisms so that the two separate pumps 51a and 51b can be independently controlled by the vehicle operator. The location of trunnion arms 21a and 21b on opposite ends of the housing 20 (corresponding to the sides of vehicle frame 88) permits the use of more efficient linkage systems (not shown).

Figure 8:
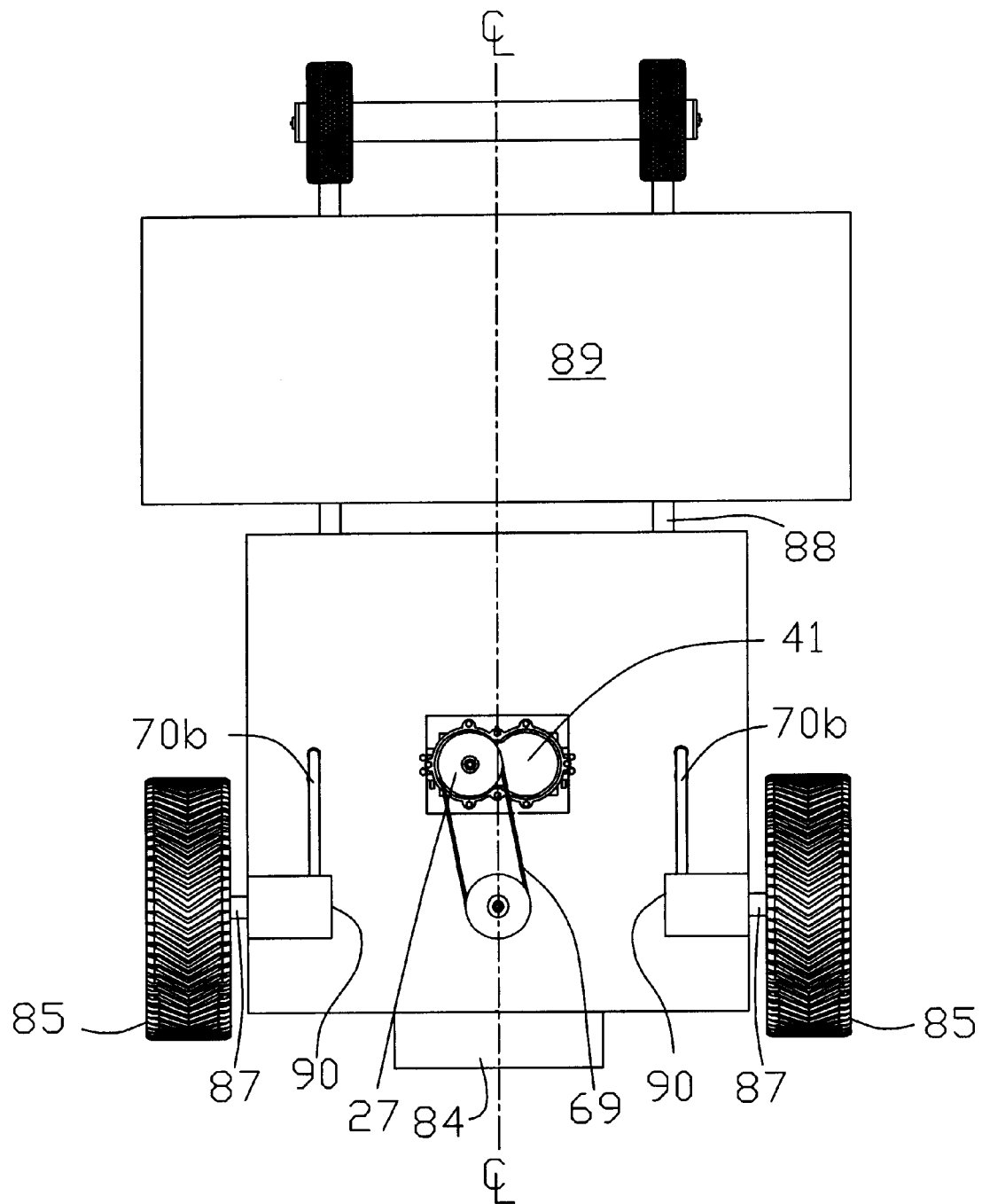
FIG. 8 is a bottom view of a vehicle including a first embodiment of the dual pump apparatus of the present invention.
Figure 9:
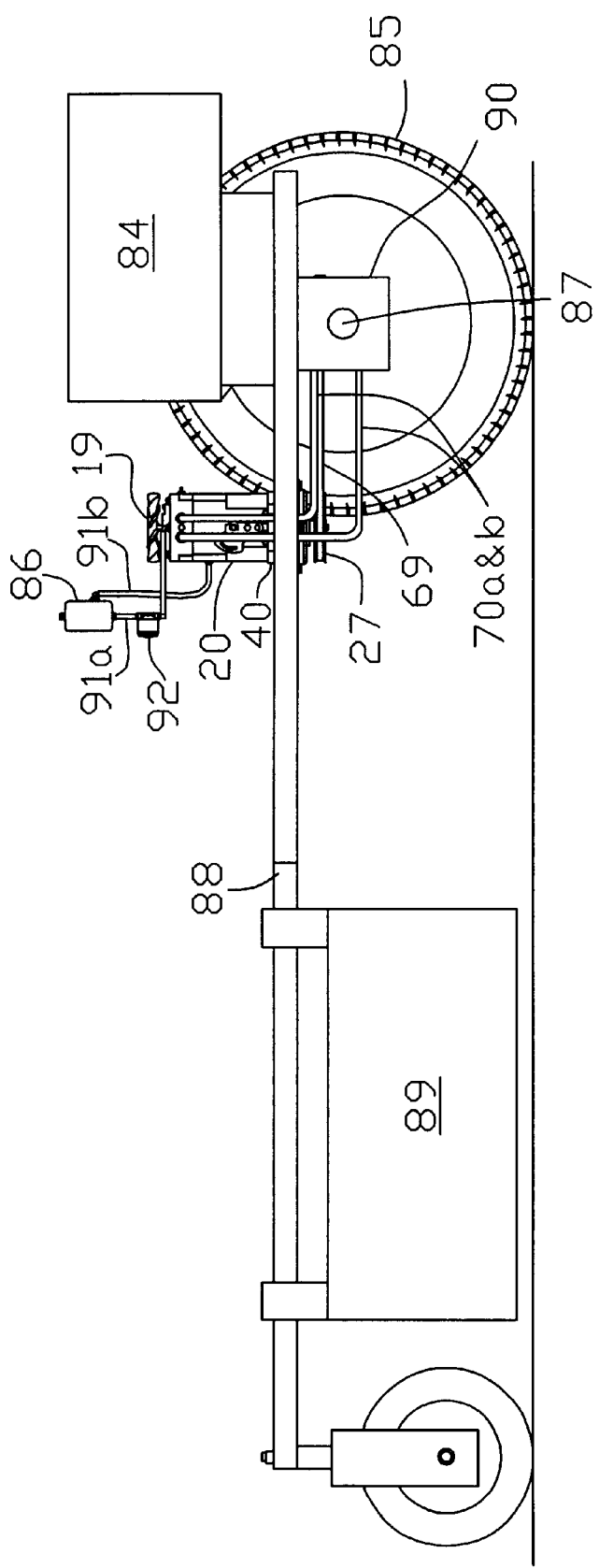
FIG. 9 is a side view of the vehicle in FIG. 8, with one wheel removed for clarity.
Figure 10:
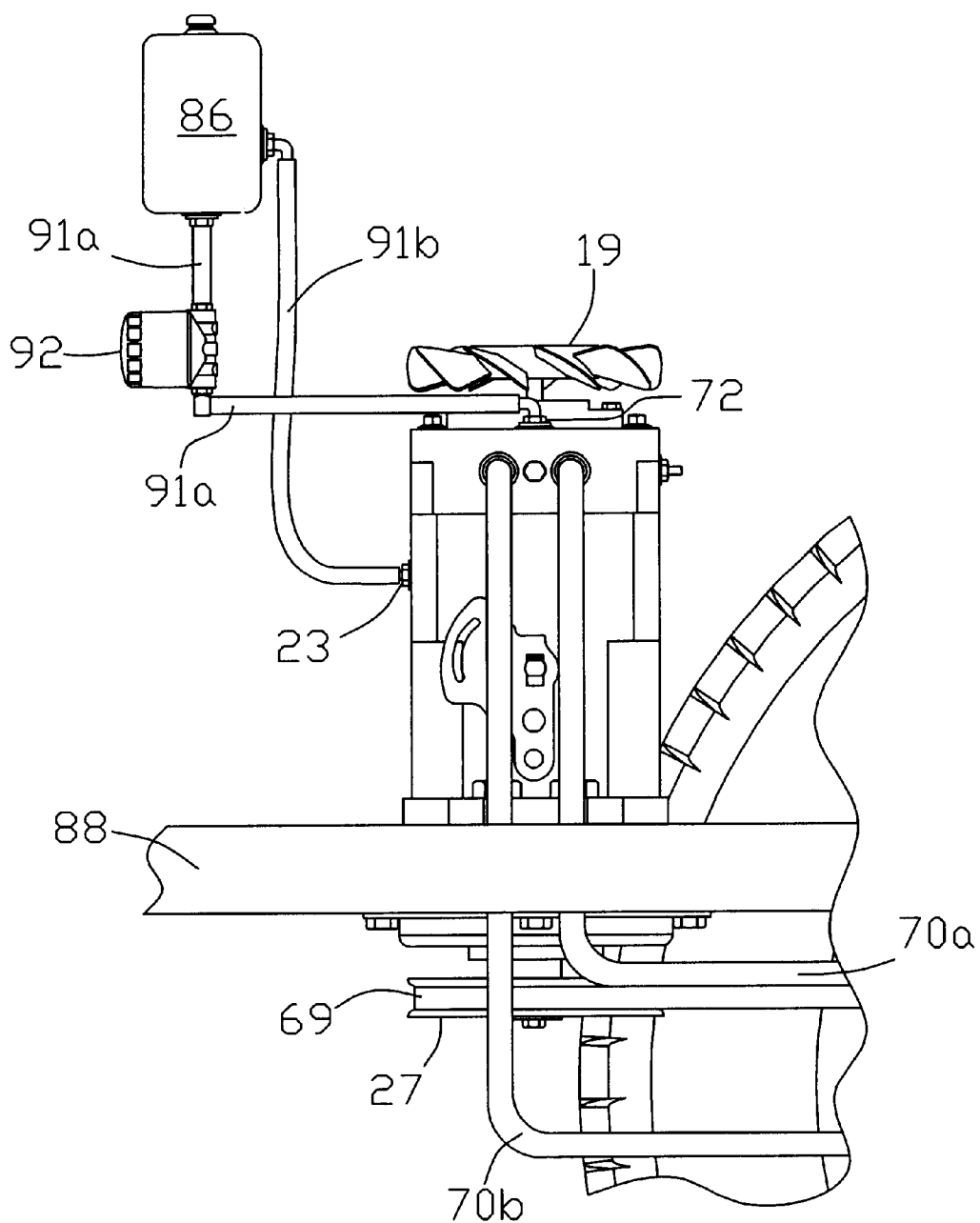
FIG. 10 is a side view of the dual pump design shown in FIG. 9.
Figure 24:
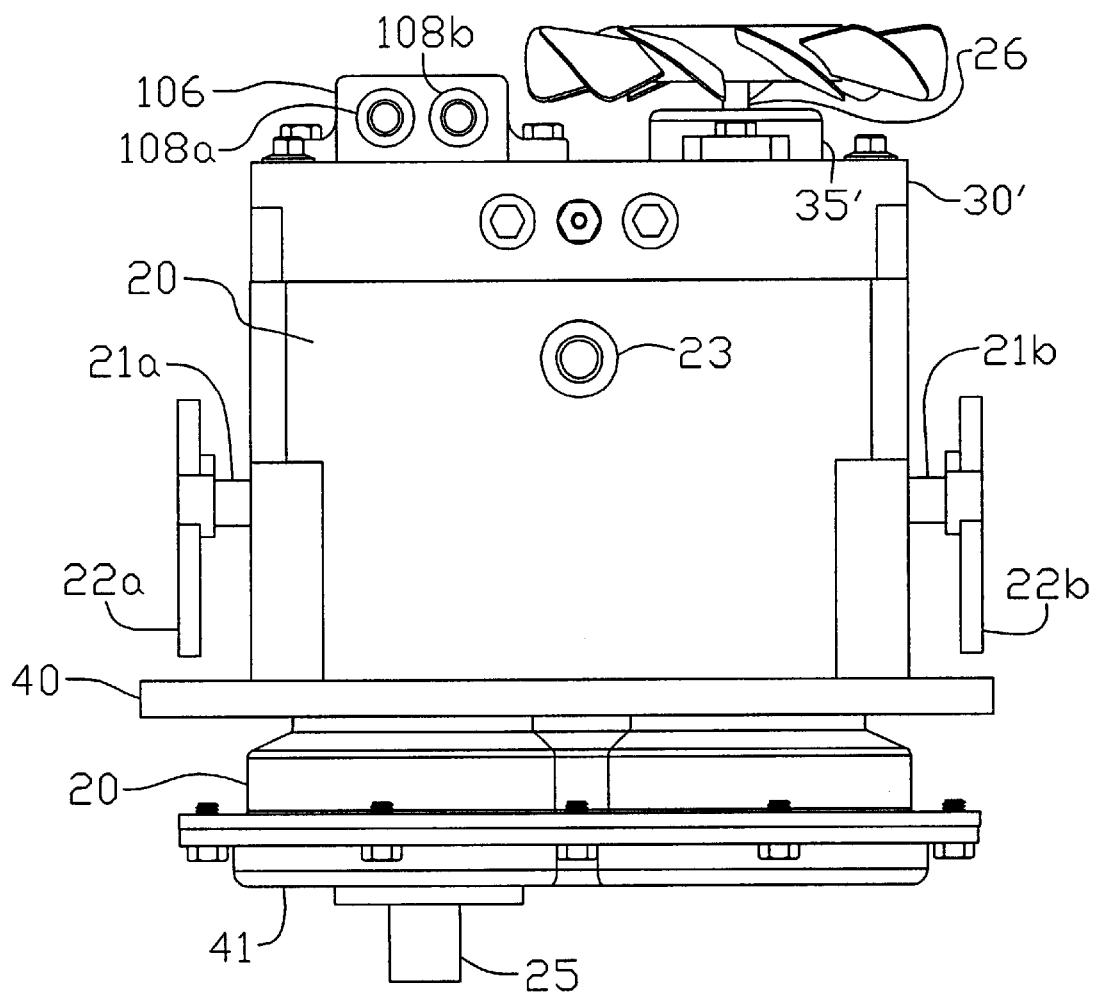
FIG. 24 is an external side view of a fifth embodiment of this invention.

Input shaft 25 is driven by pulley 27 which is engaged by a belt or other known method to an engine 84, as shown in FIGS. 8 and 9. In this embodiment, the, output of engine 84 is vertical with respect to the ground, as are the two input shafts 25 and 26. This arrangement permits the use of a cooling fan 19 on the top of housing 20, as shown in FIGS. 9 and 10, where it is secured to and driven by the end of input shaft 25. This arrangement protects fan 19 from debris that may be kicked up under the vehicle during operation. Fan 19 could also be mounted to input shaft 26, which would be extended out of the housing in a similar manner, such as is shown in FIG. 24.

Figure 16:
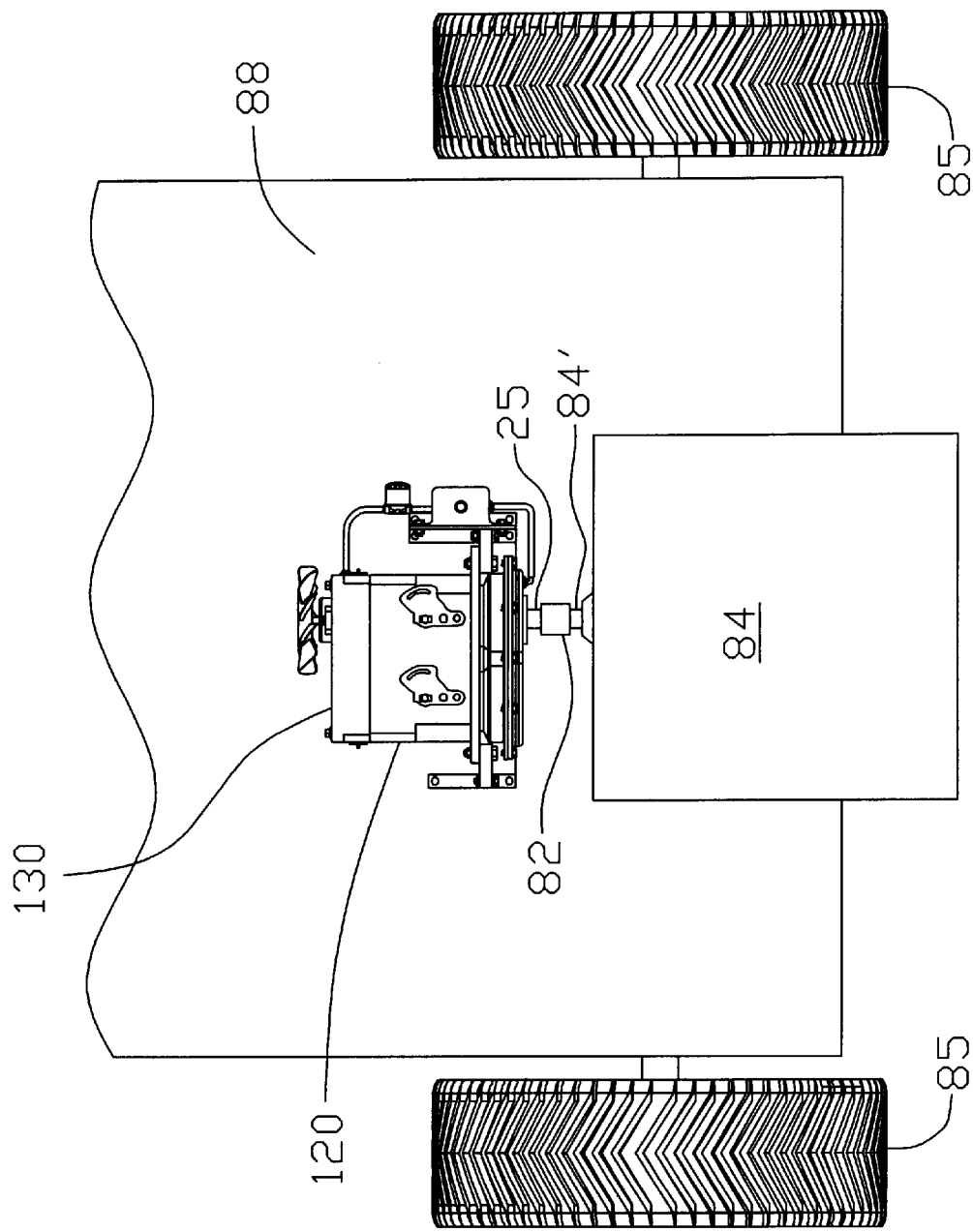
FIG. 16 is a top view of a vehicle showing the dual pump apparatus of the second embodiment of this invention.

It should be noted that the extension of input shaft 25 through charge pump cover 35, is optional; shaft 25 need not extend out in such a manner, in which case charge pump cover 35 would be a solid structure on the top thereof. Input shaft 25 could also be directly driven by engine 84, as is shown in FIG. 16 as an alternative embodiment. It will also be understood by one of skill in the art that the use of "top" and "bottom" to describe the structures shown in FIGS. 2–10, for example, is for convenience and relates to the preferred arrangement of these features. As shown elsewhere and as would be understood, this is not limiting on the manner in which such a pump Apparatus 10 could be mounted in a vehicle or other structure.

Spur gears 52a and 52b, which are preferably helical spur gears, are mounted in gear chamber 45, which may be sealed from pump chamber 50. Spur gear 52a is mounted on input shaft 25 and is directly engaged to spur gear 52b, which is mounted on shaft 26, and secured thereto through a retaining ring 54. Shaft 26 in turn drives second pump 51b.

Gear chamber 45 is formed by housing 20 and gear cover, 41, which is secured to housing 20 through a plurality of screws 43. A sealant would preferably be used at this junction surface to prevent leakage of hydraulic oil or gear grease. Input shaft 25 is supported in gear cover 41 through a retaining ring 61, bearing 62 and seal 63, and pulley 27 is secured to input shaft 25 by means of a standard screw and washer set 64. Similarly, input shaft 25 also extends through housing 20 into pump chamber 50 through bearing 65, washer 66, seal 67, and retaining ring 68 to properly locate input shaft 25 and prevent fluid leakage between pump chamber 50 and gear chamber 45. A similar arrangement would be used with the interface of second shaft 26 between gear chamber 45 and pump chamber 50.

Figure 5:
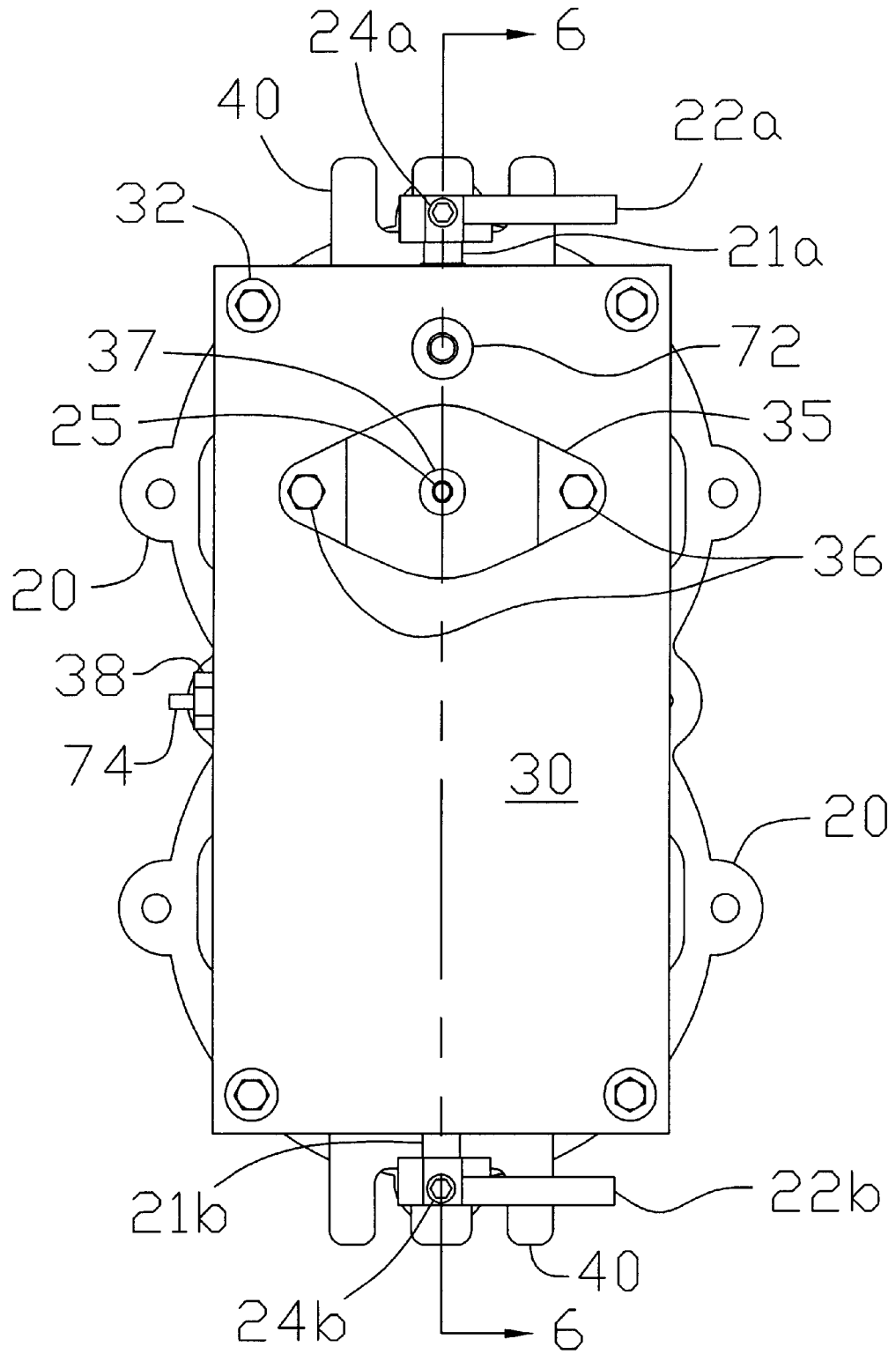
FIG. 5 is a top view of the dual pump design shown in FIG. 2.
Figure 6:
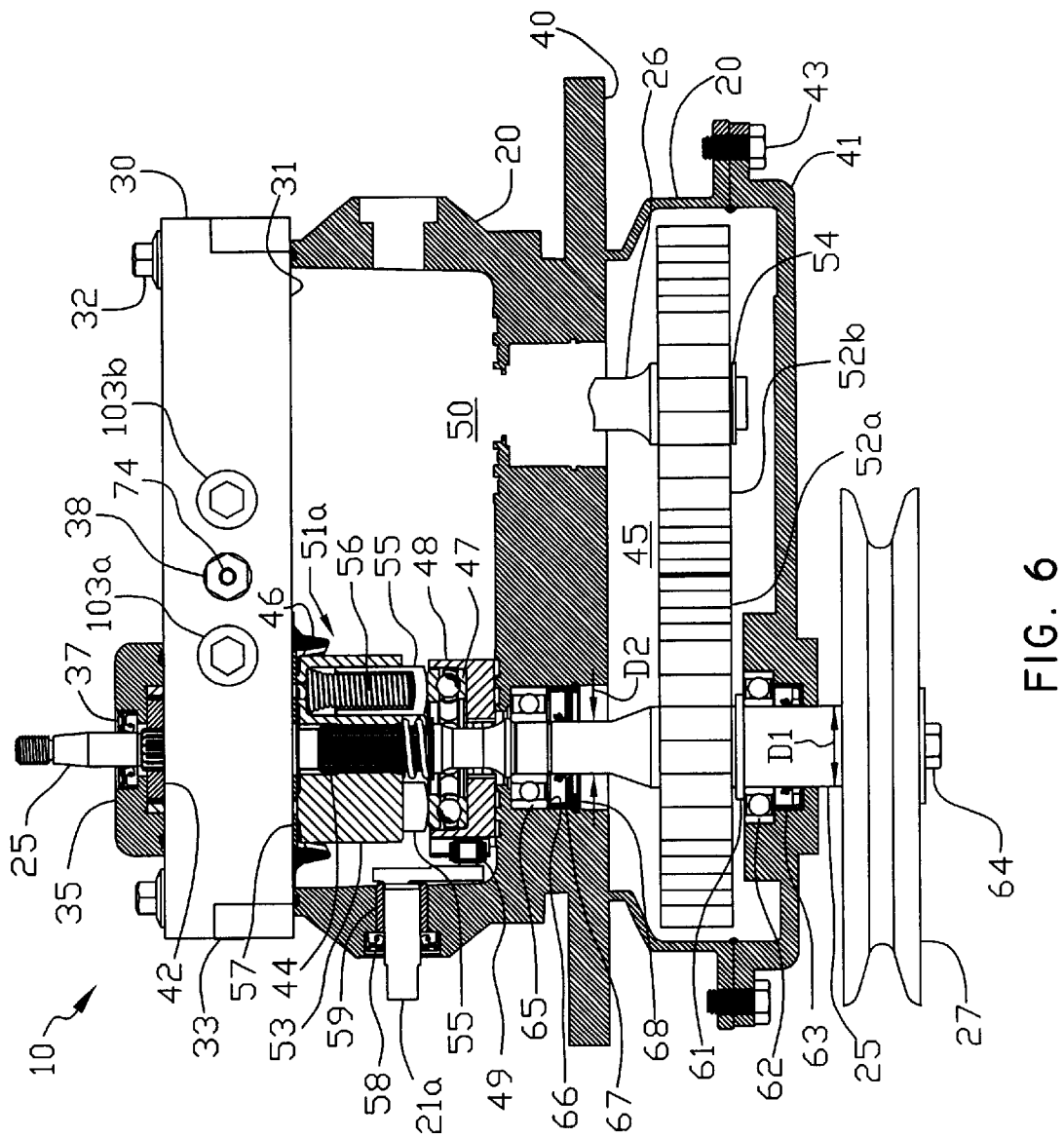
FIG. 6 is a cut-away side view of the internal components of the dual pump arrangement shown in FIG. 2, along the lines 6—6 in FIG. 5, with certain parts shown in solid and one of the pumps deleted for clarity.
Figure 7:
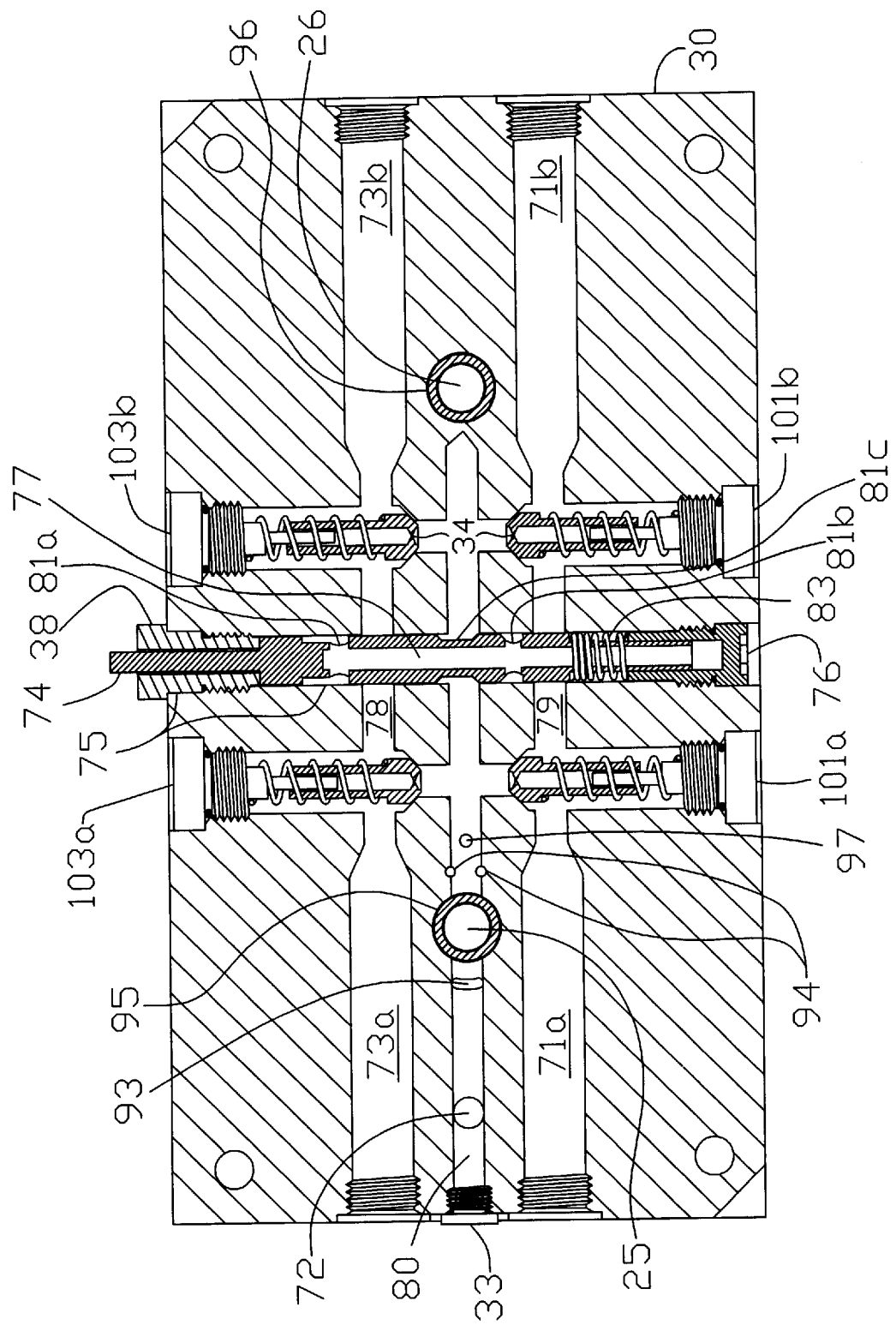
FIG. 7 is a cross-sectional view of the end cap of a first embodiment, along the lines 7—7 in FIG.2.

As shown most clearly in FIGS. 5 and 6, charge pump 42, which is a gerotor style charge 20 pump, is mounted in cover 35 and is splined to input shaft 25. Charge cover 35 is secured to end cap 30 through a plurality of screws 36 and a seal 37 is used to prevent fluid leakage.

The hydraulic porting in end cap 30 is shown in FIG. 7. System ports 71 and 73 extend through the length of end cap 30, with ports 71a and 73a in communication with first pump 51a. A set of check valves 101a, 101b, 103a and 103b are threaded into respective openings in end cap 30, corresponding to ports 71a, 71b, 73a and 73b. Check valves 101a, 101b, 103a and 103b are of a standard poppet design known in the art, and each includes a bleed 34 formed in the end thereof. Check valves 101a and 103a are in communication with pump 51a, while check valves 101b and 103b are in communication with pump 51b.

One of ports 71a or 73a will be under high pressure when pump 51a is in stroke and the other port will be under low pressure, or vacuum. When swash plate 48 is moved to the neutral position neither port will be under pressure, and when the direction of swash plate 48 changes (e.g., from forward to reverse) the status of ports 71a and 73a will switch, with the formerly low pressure or vacuum side being placed under high pressure, and vice versa. The ends of each system ports 71a, 71b, 73a, and 73b are threaded to permit connection of the necessary hoses and the like. Channel 78 is cast into end cap 30 to connect system ports 73a and 73b, while channel 79 connects system ports 71a and 71b.

A further benefit of this design is the use of a single bypass valve for both pumps. As shown most clearly in FIG. 7, the bypass consists of valve body 38 mounted in opening 75, which is bored through end cap 30. Plug 76 is mounted in the opposite end of valve opening 75, and valve actuator 74 is mounted in plug 76 and extends through the length of opening 75 to extend out of valve body 38. Bypass actuator 74 is shaped so that when the bypass is not activated, it acts to block fluid flow through channels 78 and 79 so that the two sides are not in fluid communication with one another. Actuator 74 also includes two throats 81a and 81b each having a cross-drilled hole therein, and a central passage 77 formed internally through the body of actuator 74. When actuator 74 is depressed, it moves in an axial direction, compressing bypass spring 83, so that throat 81a is moved into channel 78 and throat 81b is moved into channel 79, thus permitting fluid flow into central passage 77 and into all four system ports 71a, 71b, 73a and 73b, placing the unit into bypass mode. Throat 81c is formed on bypass valve actuator to permit charged oil to flow to check valves 101b and 103b during normal operation.

FIGS. 8 and 9 depict a vehicle incorporating a first embodiment of the present invention. The arrangement shown here is of a rear engine mounting, where engine 84 is mounted on vehicle frame 88, which also supports wheel motors 90, mower deck 89 and other possible attachments. Axles 87 extend from wheel motors 90 and drive vehicle wheels 85.

Pump housing 20 is mounted on the top of the vehicle frame 88 in the manner shown so that end cap 30 is on the top of housing 20 and pulley 27 is mounted on the bottom thereof. A mounting flange 40 may be integrally formed with or otherwise attached to housing 20 to secure the pump apparatus 10 to frame 88 in a number of known manners. Belt 69 extends from engine 84 to pulley 27 to drive the dual pumps in the manner described herein. Hydraulic high pressure hoses 70a and 70b carry fluid from threaded system ports 71 and 73 to the respective wheel motors 90. The unit 10 is preferably located along the center line of the vehicle, i.e., along the center of the longitudinal axis of the vehicle, as shown in FIG. 8. Unit 10 may be rotated 90 degrees from the orientation shown in FIG. 8, such that the input shafts 25 and 26 are located on the vehicle center line in addition to having the unit 10 located on the vehicle center line. This location of housing 20 simplifies the arrangement and connections of the various hoses, linkage mechanisms and the like. One such advantage is that hoses 70a and 70b may be generally symmetrical in length and routing. This length symmetry includes having hoses 70a of one generally identical length and hoses 70b of a second generally identical length, or having hoses 70a and 70b being of one generally identical length. Note that while the aforementioned discussion relates to the preferable positioning of the pump unit 10 on the vehicle center line, the pump unit may be positioned in other locations as need dictates.

This embodiment includes an external oil reservoir 86 which may be mounted at various locations on the vehicle. Oil drains from pump chamber 50 through case drain 23, through outlet hose 91b to the reservoir. Oil returns to the system through inlet hose 91a, passing through filter 92 into charge pump inlet 72. An optional oil cooler (not shown) could also be added to the system and located to take advantage of the air flow from cooling fan 19.

Referring to FIGS. 3 and 7, channel 80 is bored into end cap 30 and is sealed at its open end by a cap or plug 33 or similar means. The location of this channel 80 between system ports 71 and 73 allows for a narrower end cap 30 than known designs. Charge pump inlet 72 provides filtered oil from reservoir 86 through hose 91a. The opening in which plug 33 is mounted could also be used as the charge pump inlet from reservoir 86 as an alternative design. This would eliminate the need for separate inlet 72, but given the small space around bore 80 on the external housing, assembly and maintenance become more complicated with such an alternative design.

Kidney 93 provides oil from channel 80 to charge pump 42. Pressurized oil is sent from charge pump 42 to the system through openings 94. Charge relief opening 97 is also formed in channel 80 to permit oil to be discharged therethrough in the event of excess oil pressure.

Bearing 95, which is preferably a standard friction bearing, is used not only to support input shaft 25 but also to divide channel 80 into two separate sides, where inlet 72 and kidney 93 which supply oil from the reservoir 86 to charge pump 42 are on one side thereof, and openings 94 providing pressurized oil from the charge pump 42 to the system is on the other side. A similar bearing 96 is also used to support second shaft 26.

As shown in FIGS. 2 and 10, case drain 23 is located in housing 20 in a location corresponding to pump chamber 50, so that oil will drain directly from chamber 50 to reservoir 86, and it will be passed through filter 92 before its return to the system. Filter 92 could also be located on hose 91b. As noted above, pump chamber 50 and gear chamber 45 can be strictly segregated, such that the hydraulic oil used in pumps 51a and 51b is not used to lubricate spur gears 52a and 52b. This segregation would permit the use of a gear lubricant in gear chamber 45, which may be desirable in certain applications.

Figure 11:
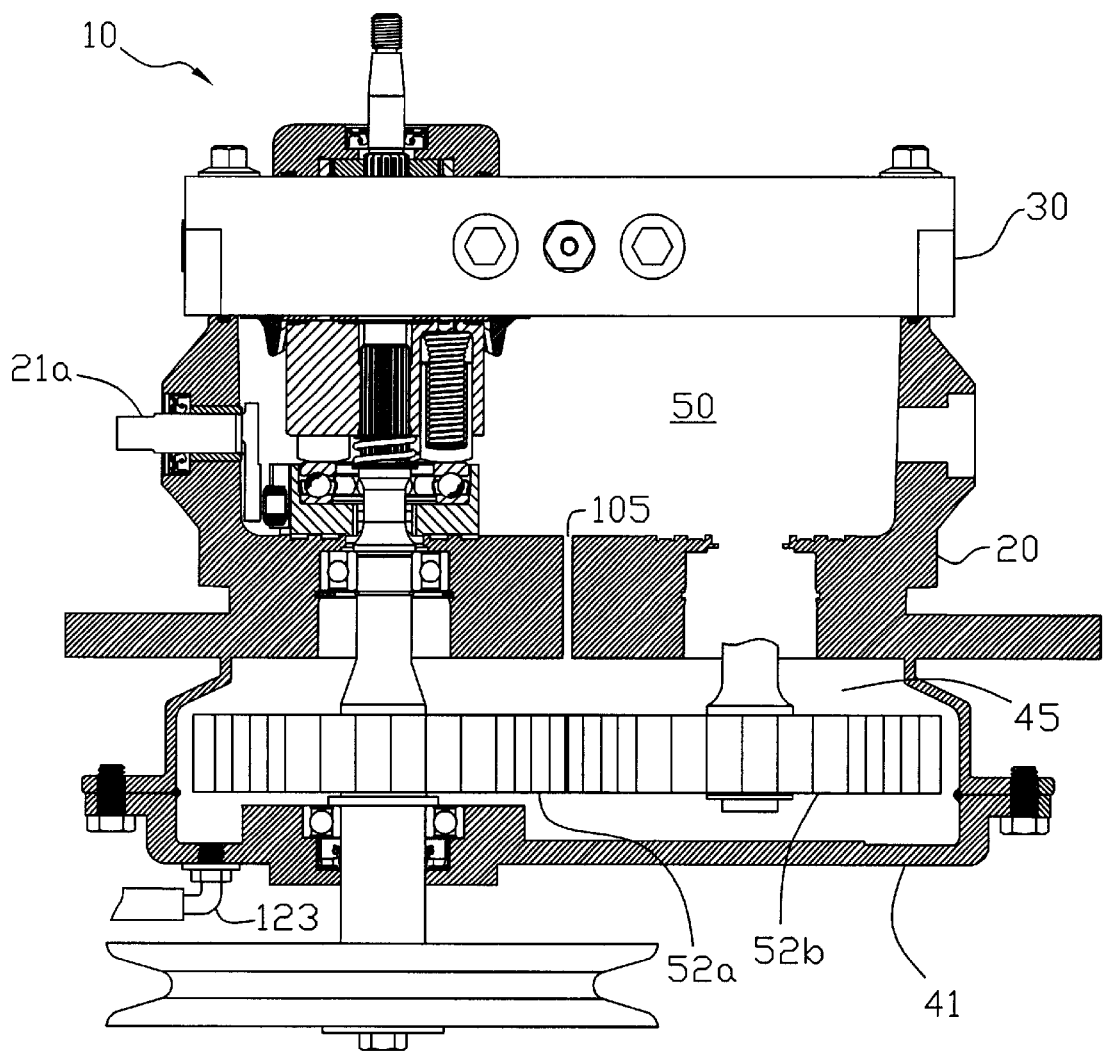
FIG. 11 is a cross sectional side view of a variation on the first embodiment of this invention, with certain elements shown in solid and the second pump deleted for clarity.

A variation of this design is shown in FIG. 11, and this variation can be combined with the other embodiments disclosed herein. In this variation, the same hydraulic oil is used in both pump chamber 50 and gear chamber 45, with case drain 123 located at the gear cover 41, which can otherwise be identical to gear cover 41 shown in FIG. 2. A leakage path 105 may be formed in housing 20 to permit oil to drain from pump chamber 50 to gear chamber 45 when the unit 10 is in the standard arrangement as shown in FIG. 11. A benefit of this design is that, due to its location, gear chamber 45 will generally be cooler than pump chamber 50, which will assist in the cooling of the hydraulic oil. This arrangement will also ensure that any impurities introduced to the oil from spur gears 52a and 52b will be passed through filter 92 before being returned to the system, which is particularly important if pump chamber 50 and gear chamber 45 are not strictly segregated.

Figure 26:
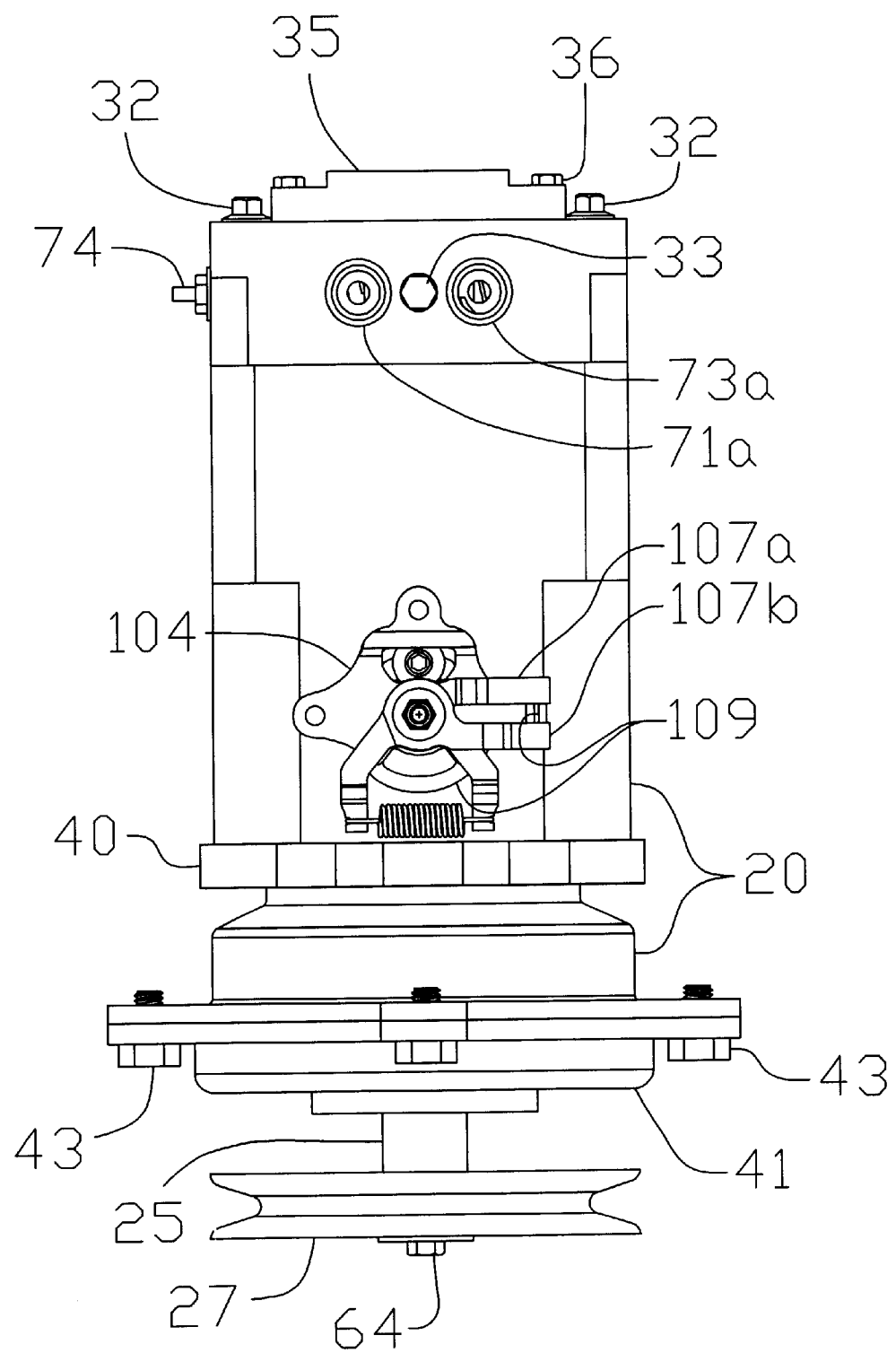
FIG. 26 is an external end view of a seventh embodiment of this invention.

A further variation on the preferred embodiment is shown in FIG. 26, which includes control arm 104 combined with scissor arms 107a and 107b and return arms 109 to create a return to neutral feature for the hydraulic pumps 51a and 51b. This structure would obviously be used on both sides of the housing 20. Similarly, friction packs and stops which have been used in conjunction with other hydrostatic devices could also be used with unit 10.

A second embodiment of the present invention is shown in FIGS. 12–19. In this embodiment of pump apparatus 110, the orientation of the swash plates 48 has been changed, which also changes the location of trunnion arms 21a and 21b, control arms 22a and 22b and output system ports 171a, 171b, 173a and 173b. This alternative arrangement can be used to accommodate different needs regarding vehicle linkages or other control mechanisms (not shown) that may be secured to pump apparatus 110.

Figure 12:
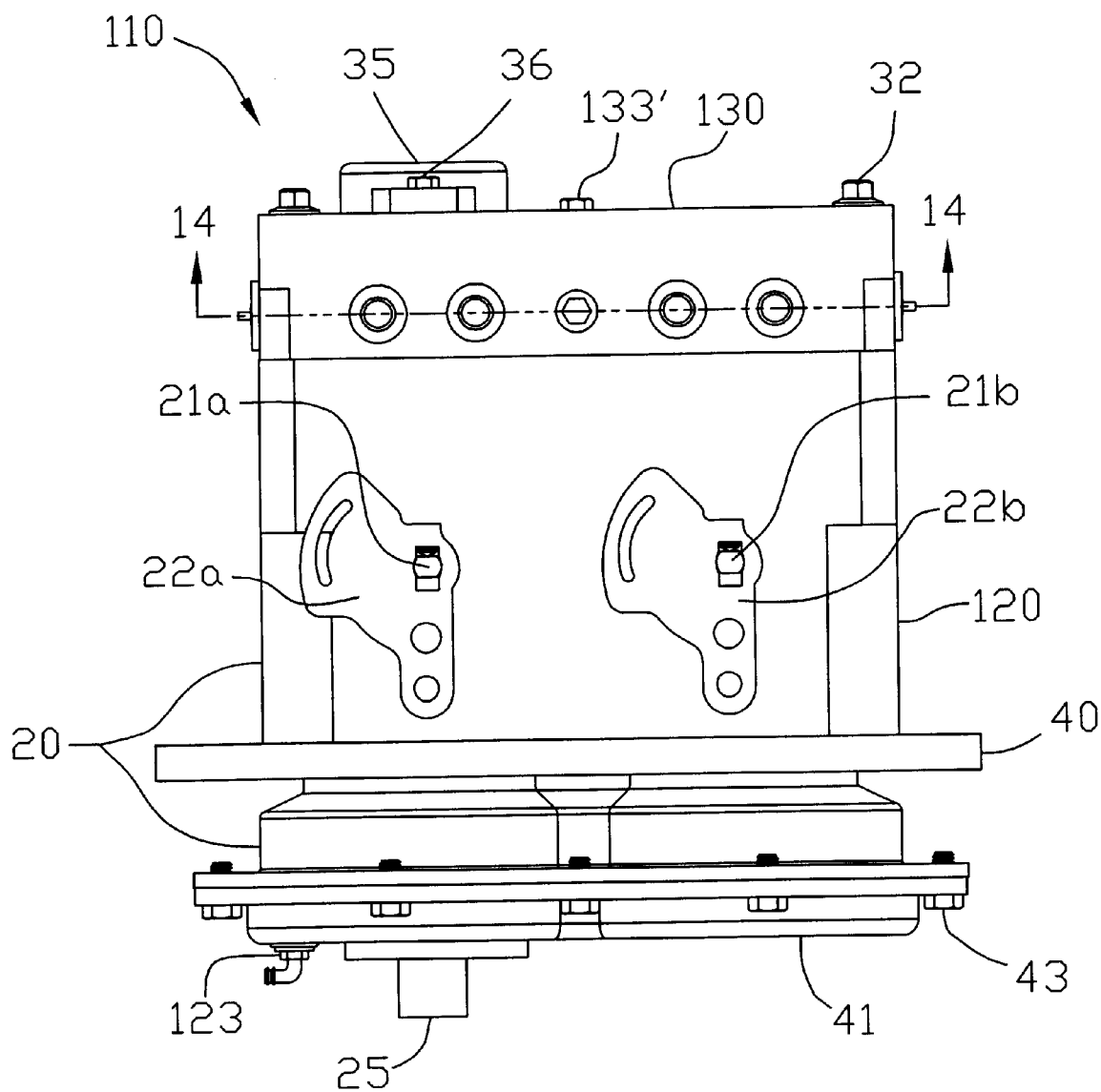
FIG. 12 is a side view of the external case of a second embodiment of the present invention.
Figure 13:
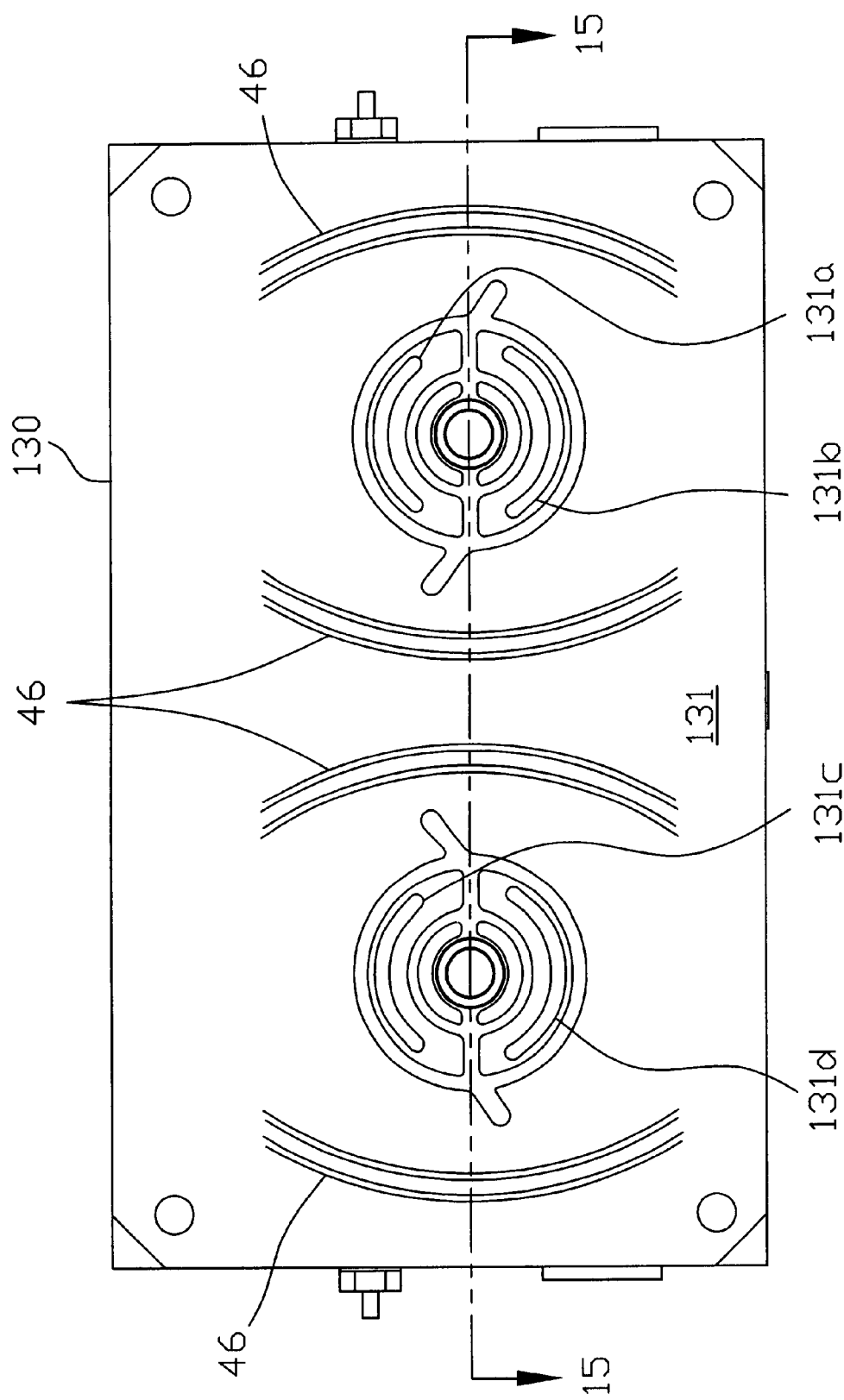
FIG. 13 is a top plan view of an end cap in accordance with the second embodiment of this invention.
Figure 14:
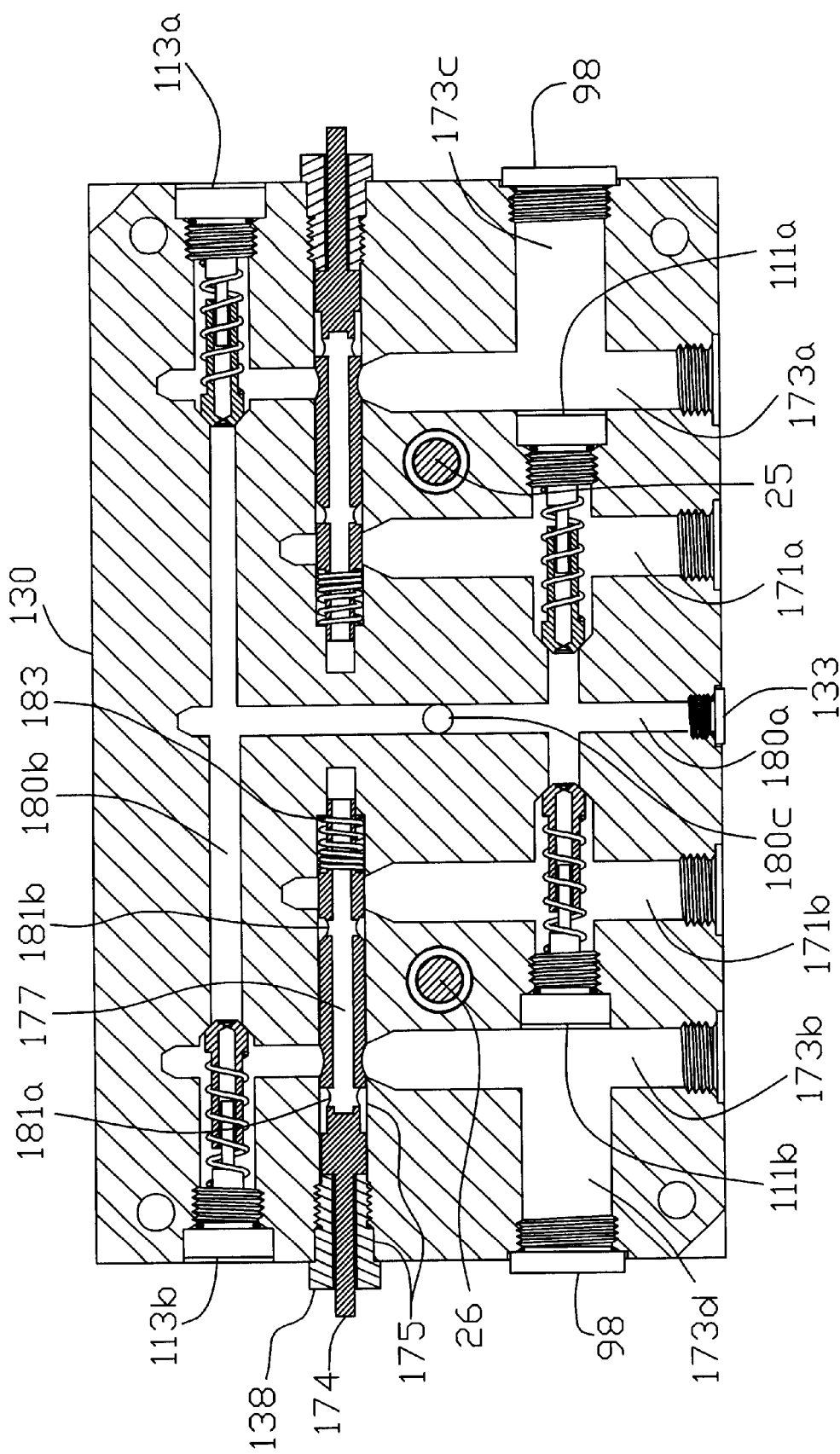
FIG. 14 is a cross-sectional top view of the end cap shown in FIG. 13.
Figure 15:
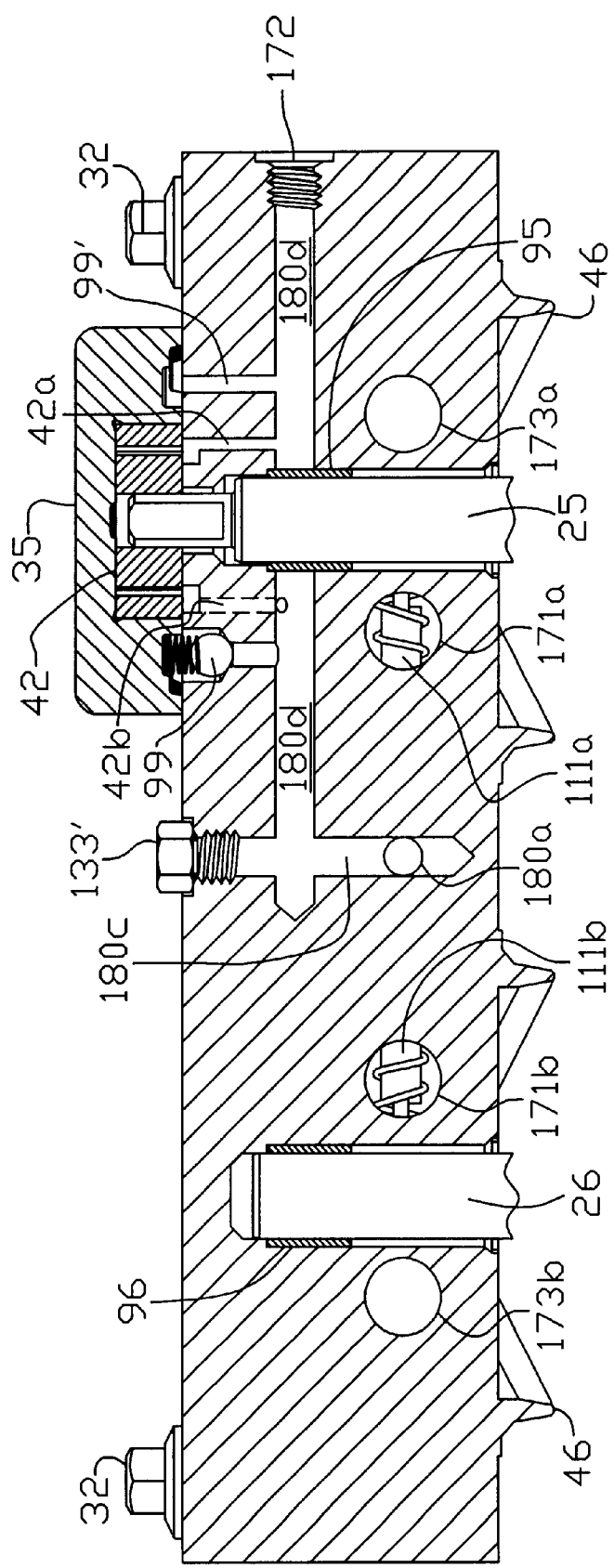
FIG. 15 is a cross-sectional side view of the end cap shown in FIG. 13 including portions of the pump shafts.
Figure 18:
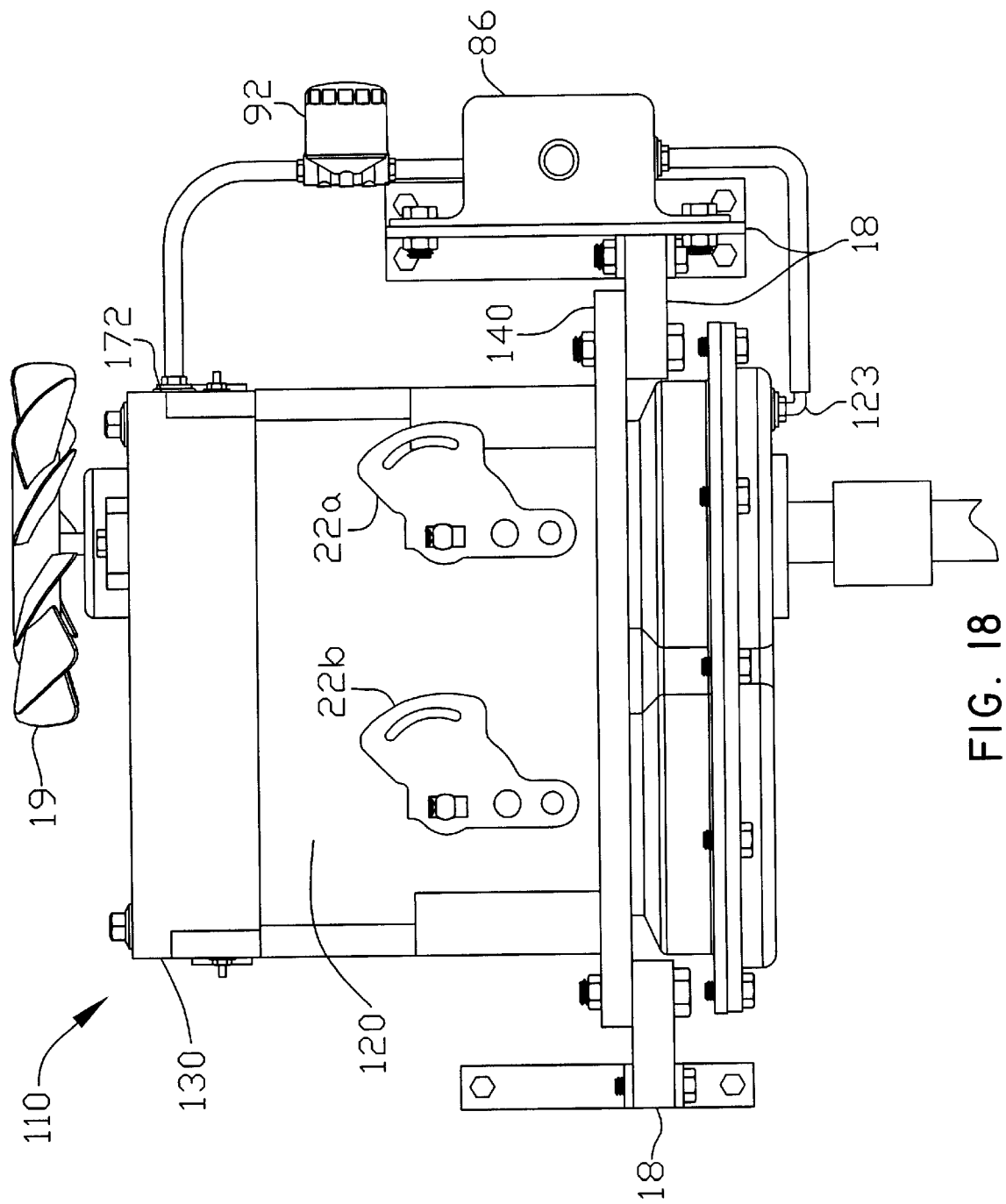
FIG. 18 is a side view of the external casing of the dual pump arrangement in accordance with the second embodiment of this invention as shown in FIG. 16.
Figure 19:
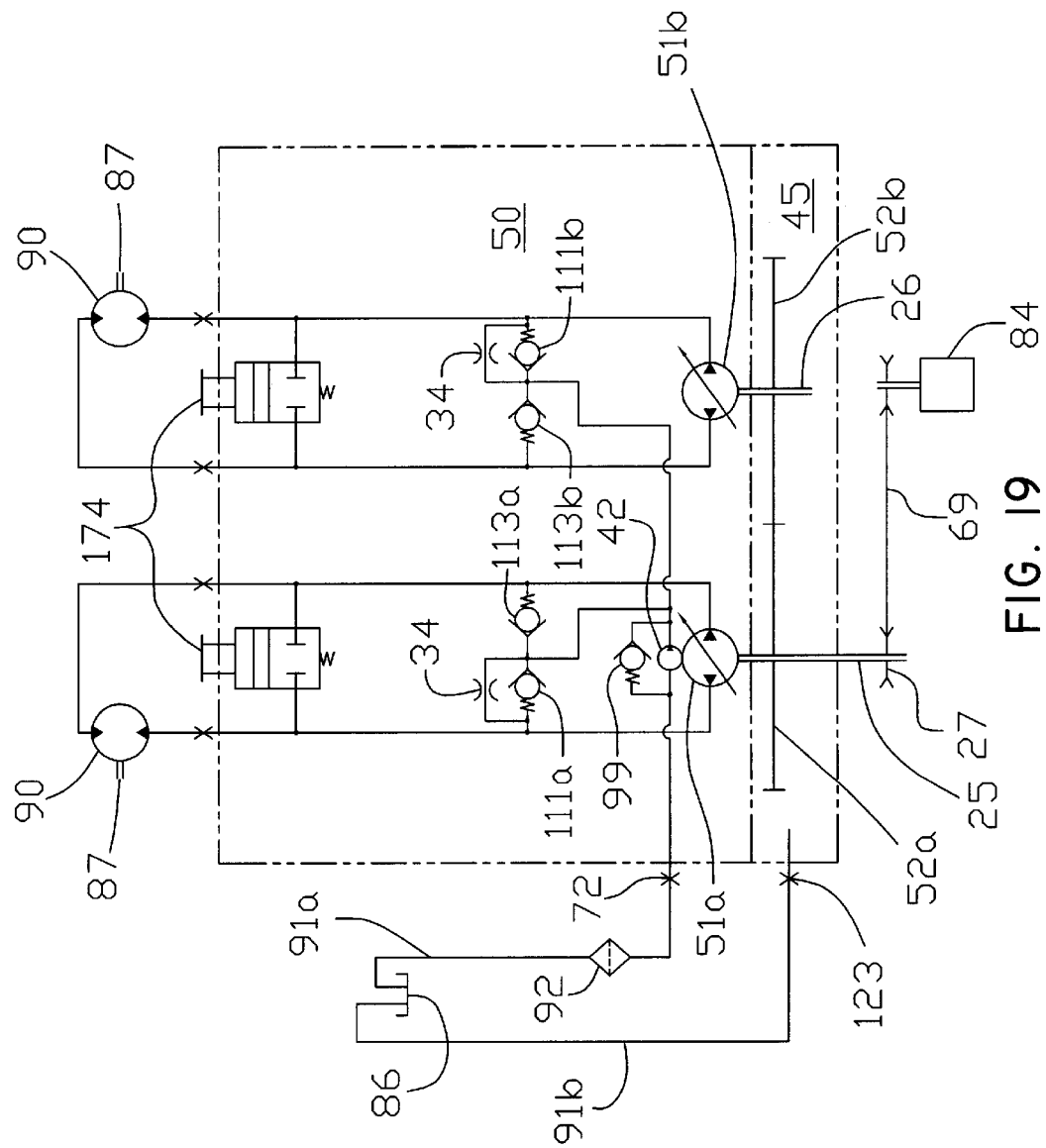
FIG. 19 is the hydraulic schematic of the second embodiment of this invention.

As shown in FIGS. 12 and 18, trunnion arms 21a and 21b extend from a common side of the housing 120, instead of from opposite ends as is shown in FIG. 2. This rotation of the orientation of swash plates 48 requires a different end cap 130, as shown in FIGS. 13–15. As shown in FIG, 13, pump running surface 131 includes a pair of kidneys 131a and 131b corresponding to first pump 51a and a second pair of kidneys 131c and 131d corresponding to second pump 51b. The orientation of kidneys 131a–d has been rotated ninety degrees from that of the first embodiment.

FIG. 14 shows a cross-section of end cap 130 along the lines 14—14 in FIG. 12, while FIG. 15 shows a cross-section along the lines 15—15 in FIG. 13. In this embodiment, system ports 173a and 171a correspond to kidneys 131a and 131b and ports 171b and 173b correspond to kidneys 131c and 131d. In this embodiment the charge channel comprises a plurality of sections, including sections 180a, 180b, 180c and 180d drilled into end cap 130 at right angles to one another, with section 180a capped by plug 133 at its external end and section 180c capped by plug 133' at its external end. Fluid enters charge channel 180d through inlet 172 which may be connected to the external reservoir 86; as in the prior embodiment, bearing 95 acts to divide channel 180d into an inlet side and an outlet side. Charge pump 42 is mounted in charge housing 35, and oil flows into charge pump 42 through channel 42a and is returned under pressure to channel 180d through channel 42b. A charge relief valve 99 consisting of a standard check ball and spring design and return channel 99' is used to prevent the charge system pressure from exceeding design limits. Given the location of system ports 171a, 171b, 173a and 173c on the same side of end cap 130, charge inlet 172 can be located on the end of end cap 130 instead of the top thereof, without concern for interference with other components as is present in the first embodiment.

System ports 173a and 173b are also cross-drilled with portions 173c and 173d at right angles to primary ports 173a and 173b, respectively, for ease of manufacture, with caps 98 used to close the ports 173c and 173d as needed. This design also permits the insertion of check valves 111a and 111b into the internal portion of end cap 130 in the manner shown. This arrangement decreases the overall size of the end cap 130 and increases the flexibility of the unit for various applications. Check valves 113a and 113b are inserted into charge channel 180b at respective ends thereof. Having all of the required elements located in the same plane also decreases the required thickness of end cap 130.

This embodiment uses two separate bypass mechanisms which are identical in construction, and thus only one need to be described. There are a number of known manners to retain such a bypass mechanism in the actuated mode, such as the use of a detent and/or cotter pins. With reference to the bypass mechanism on the left side of FIG. 14, it can be seen that a valve opening 175 is bored through a portion of end cap 130, and valve body 138 is mounted at the open end thereof. Valve actuator 174 is mounted in opening 175 and extends out of valve body 138; spring 183 mounted in the opposite end of opening 175 acts to maintain actuator 174 in the position shown in FIG. 14, i.e., the non-bypass or operation position.

Throats 181a and 181b formed in actuator 174 correspond with system ports 173b and 171b, respectively, and with open central passage 177, so that when actuator 174 is activated and depressed, ports 173b and 171b are in fluid communication and thus that side of the unit is in bypass. Similarly, actuation of the other bypass mechanism shown in FIG. 14 will place ports 173a and 171a in fluid communication, thus creating a bypass arrangement for the other side.

Figure 17:
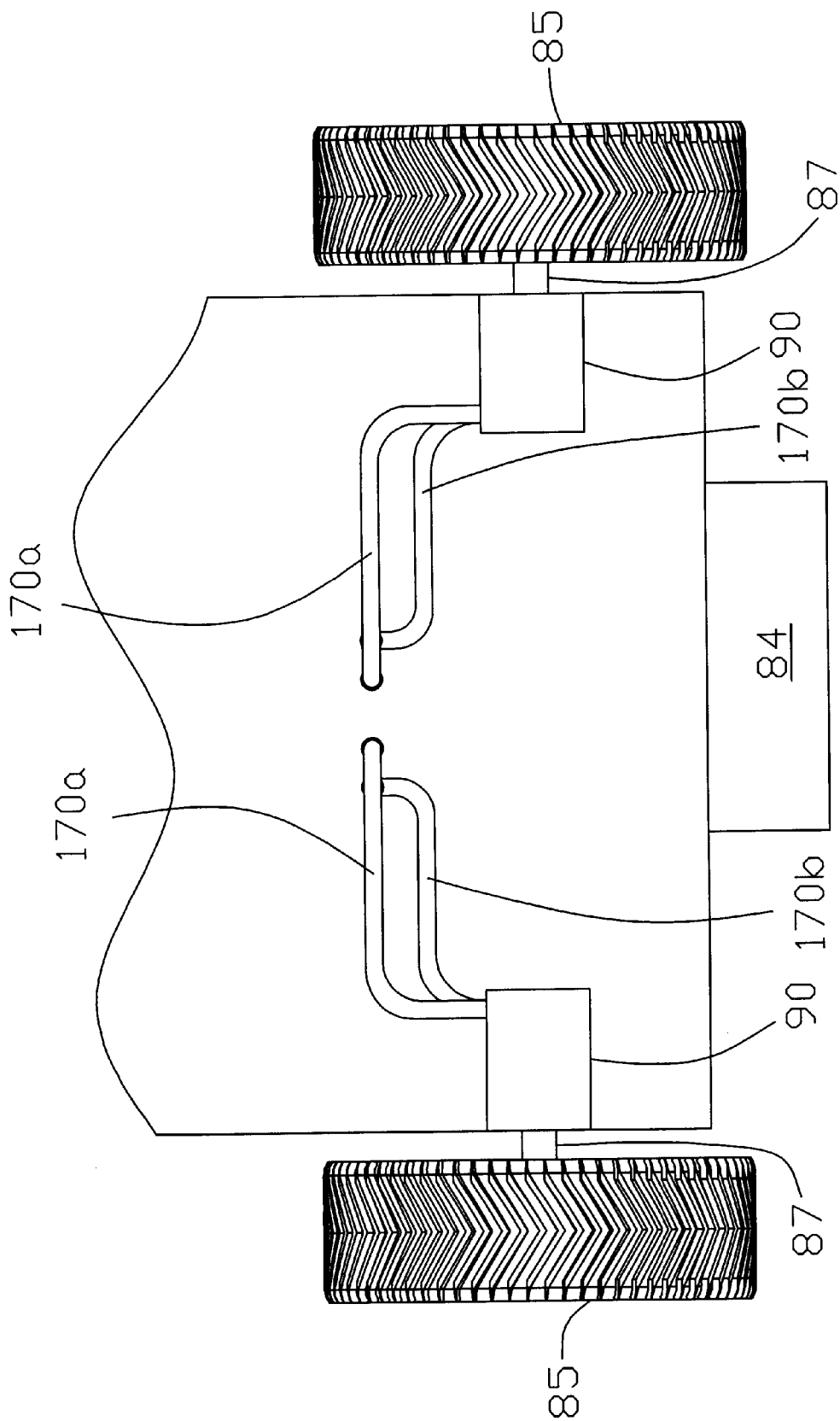
FIG. 17 is a bottom view of the vehicle shown in FIG. 16.

As shown most clearly in FIGS. 16–18, this arrangement permits the pump apparatus 110 to be mounted on vehicle frame 88 so that the axes of pumps 151a and 151b are parallel to the longitudinal axis of the vehicle, as opposed to FIG. 8, where these axes are perpendicular to one another. This design permits the primary input shaft 25 to be directly driven by engine shaft 84', with the two shafts connected by a standard coupler 82. This eliminates the need for a separate belt and pulley, which decreases costs and increases the efficiency of the unit. Reservoir 86 may be secured to housing flange 140 (or to vehicle frame 88) by means of brackets 18 or other known fastening mechanisms and is in communication with case drain 123.

In this design, control arms 22a and 22b are mounted on the top side of housing 120 with respect to vehicle frame 88, which may increase the ease of connection with the various linkage mechanisms (not shown), depending on the structure of the vehicle. This arrangement also simplifies the connection of the high pressure hydraulic hoses 170a and 170b from system ports 171a, 171b, 173a and 173b to wheel motors 90, which drive axles 87 and wheels 85.

Figure 20:
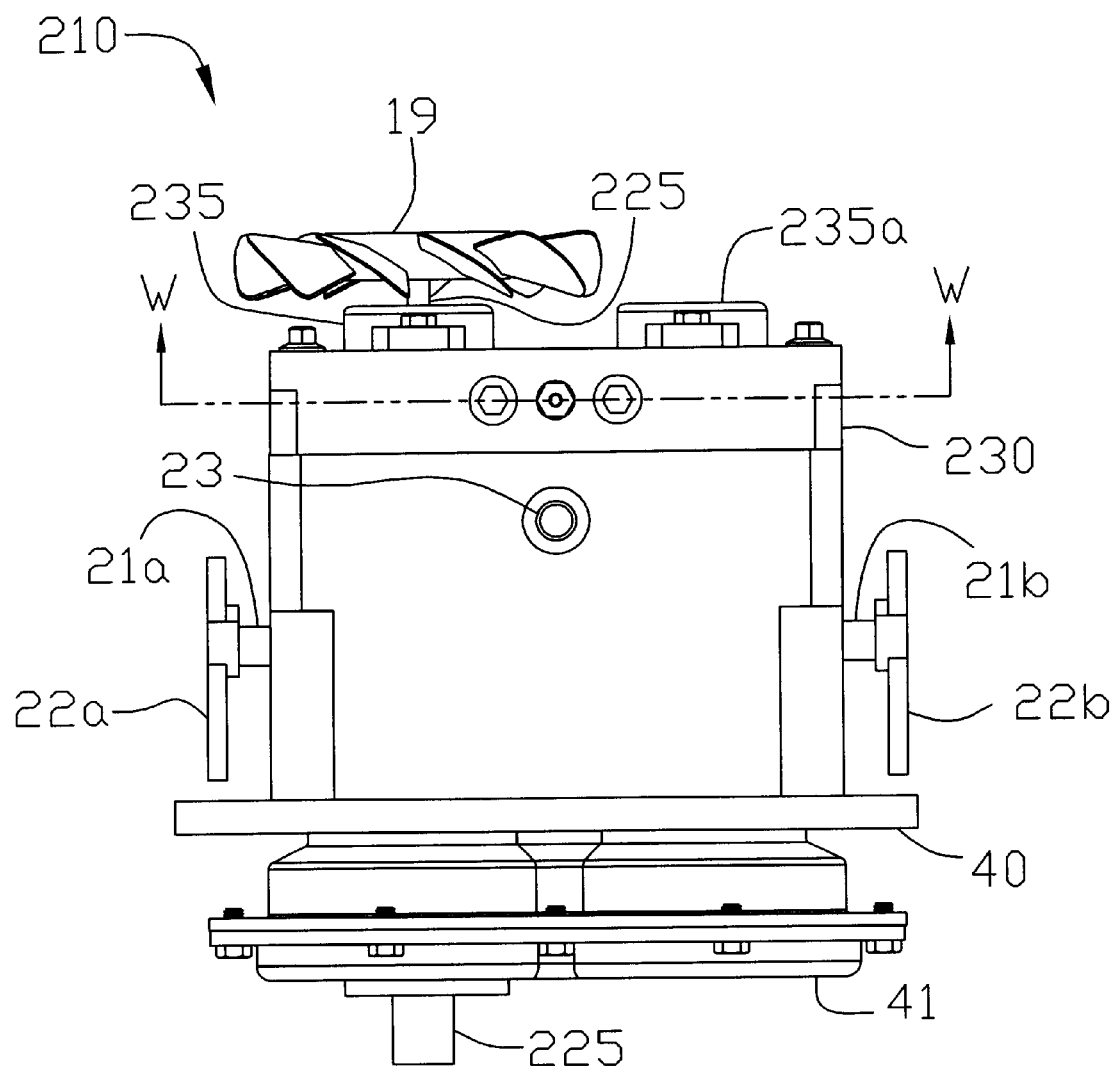
FIG. 20 is an external side view of a third embodiment of this invention.
Figure 21:
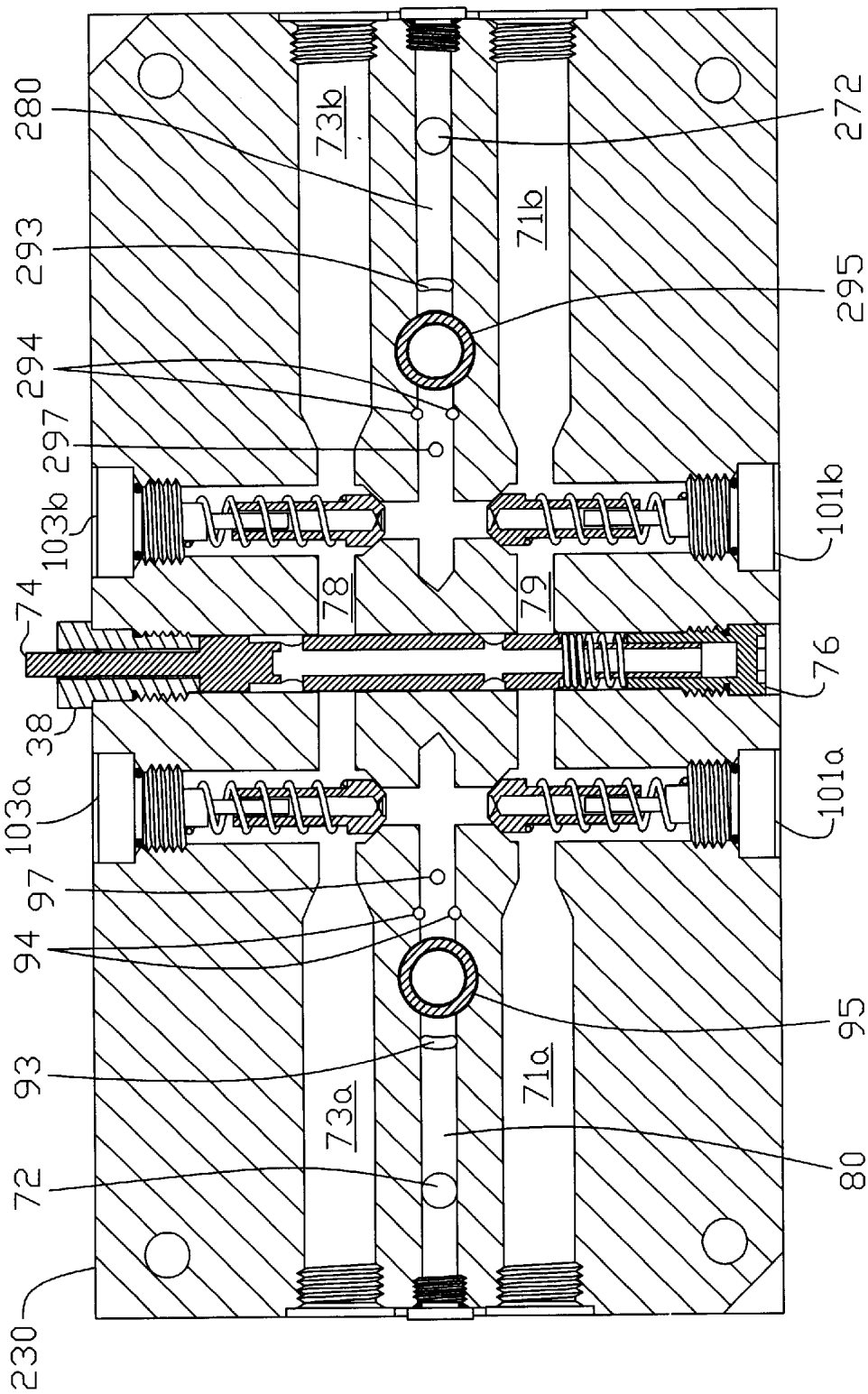
FIG. 21 is a cross sectional top view of the end cap for the embodiment shown in FIG. 20.
Figure 22:
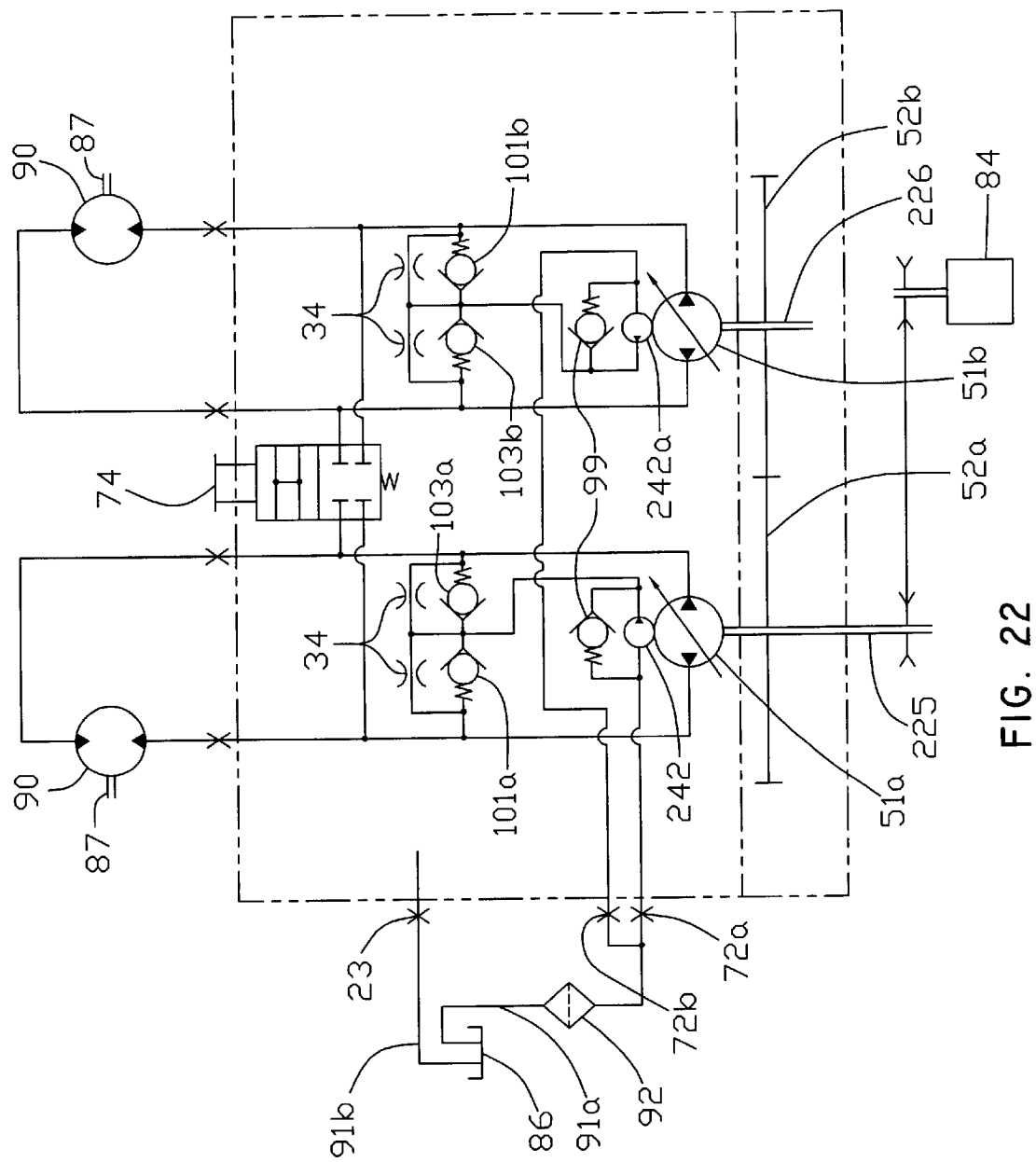
FIG. 22 is the hydraulic schematic for the embodiment shown in FIG. 20.

A further embodiment is shown in FIGS. 20–22, where the primary distinction from the embodiments described above is the use of two separate charge pumps, namely charge pump 242 mounted in cover 235 and driven by primary input shaft 225, and a second charge pump 242a mounted inside second charge cover 235a and driven by second input shaft 226. Both charge covers 235 and 235a may be mounted on end cap 230 in a manner similar to that disclosed above.

End cap 230 shown in FIG. 21 is substantially identical to end cap 30 shown in FIG. 7, with the addition of a second charge pump channel 280 on the side of end cap 230 opposite to charge channel 80. The design and operation of charge pump channel 280, bearing 295, inlet 272, kidney 293, return openings 294 and charge relief 297 corresponding to second pump 51b are generally identical to those features of the corresponding first pump 51a on the opposite side of end cap 230, as described above with regard to FIG. 7. The other element of this embodiment, such as bypass actuator 74 and check valves 101a, 103a, 101b and 103b can be identical to that described above. As shown in the schematic shown in FIG. 22, the two charge inlets 72a and 72b can be fed from a single input from filter 92. This design permits use of smaller charge pumps and a better balance of the charge pressure of the two sides of the circuit, which may be appropriate for certain applications.

Figure 23:
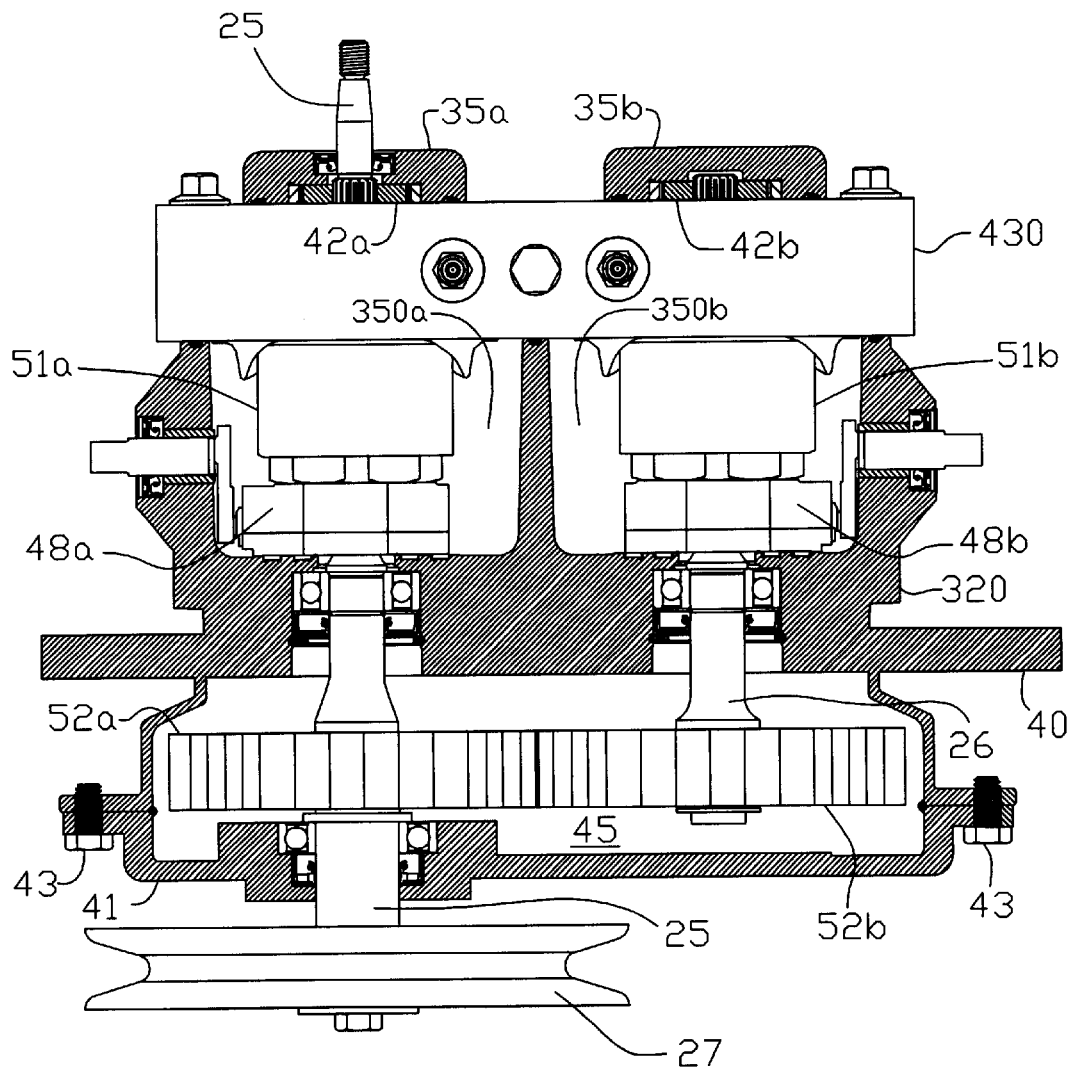
FIG. 23 is a cross sectional side view of a fourth embodiment of this invention, again with certain elements shown in solid for clarity.

A further embodiment is shown in FIG. 23, wherein the housing 320 is modified to provide two separate internal pump compartments 350a and 350b for pumps 51a and 51b; both pump 51a and 51b having respective charge pumps 42a and 42b, and the porting and associated structures of end cap 430 can be identical to that described with respect to FIGS. 20–22. Such a design would be preferred in industrial applications, where it is more likely that the different pumps 51a and 51b would be subjected to widely varying pressures depending on their uses. Such a design would require some duplication of components, such as the case drains, that would be obvious to one of skill in the art.

A unique feature of the present invention is its flexibility in allowing different arrangements of its features. One further embodiment is shown in FIG. 24, where auxiliary pump 106 is mounted on end cap 30'. This embodiment is for purposes of illustration otherwise externally identical to that shown in FIG. 20. Auxiliary pumps are known for use with bantam duty pumps and other hydrostatic devices and generally are used to provide hydraulic fluid to power elements such as hydraulic lifts, mower decks, and the like. Auxiliary pump ports 108a and 108b are connected to the external apparatus (not shown) to be powered and to the reservoir, as is known in the art. The internal structure of auxiliary pump 106 can be one of many designs known in the art for such uses. In this embodiment shown in FIG. 24, a charge pump (not shown) is mounted within cover 35' mounted on end cap 30'. The primary internal distinction from end cap 230 shown in FIG. 20 is that end cap 30' in FIG. 24 would only need the porting for one charge pump, similar to the design shown in FIGS. 1–10. A benefit of this design is that it permits use of an auxiliary pump within the same "envelope" as the other designs, thus permitting the user to have this auxiliary pump capacity without increasing the overall size of the unit.

Figure 25:
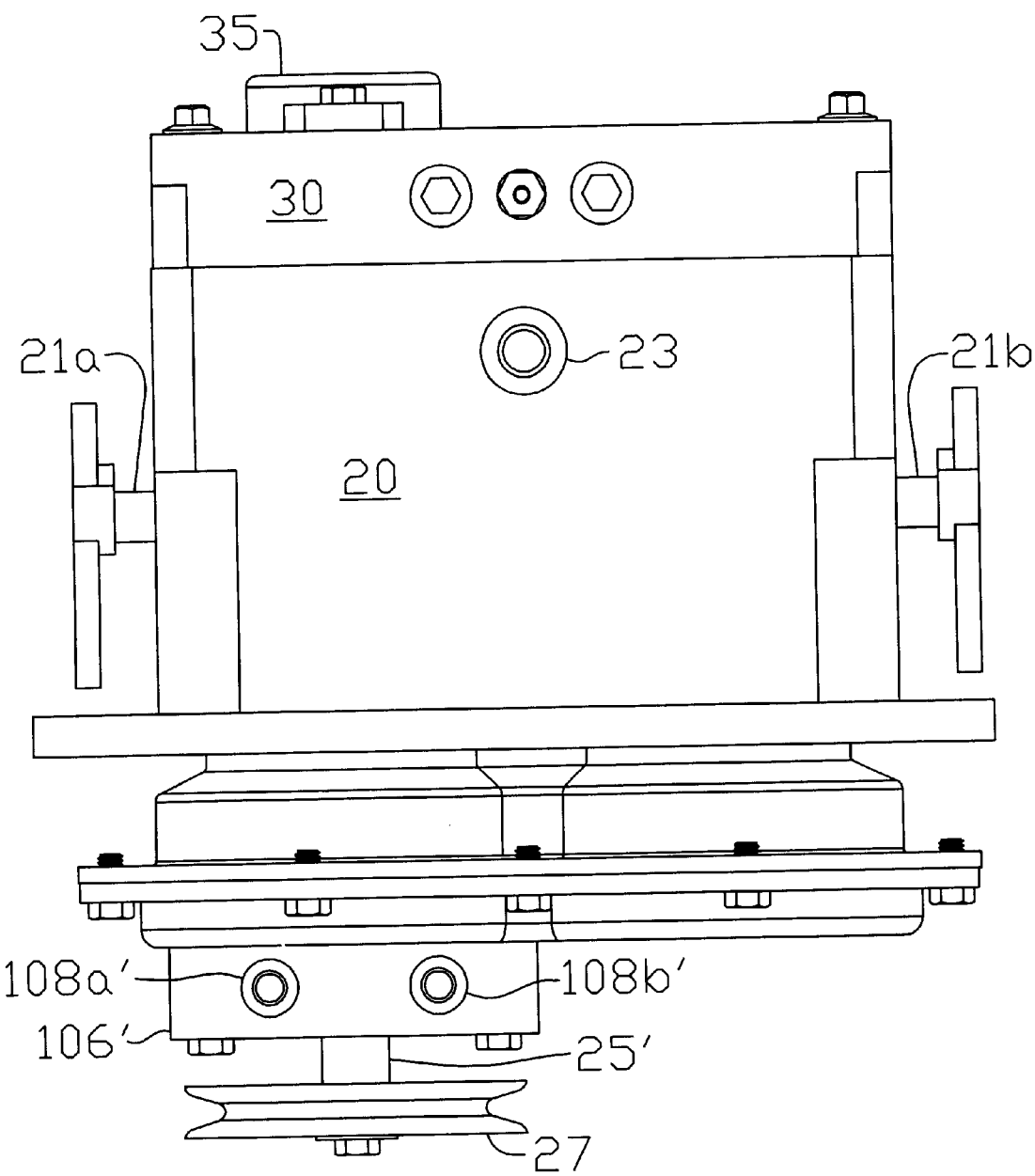
FIG. 25 is an external side view of a sixth embodiment of this invention.

A variation of this auxiliary pump design is shown in FIG. 25, where the auxiliary pump 106' is mounted on the opposite side of dual pump unit 10, which for purposes of this illustration is otherwise identical to the embodiment shown in FIGS. 1–10. As shown most clearly in FIG. 6, input shaft 25 has a first diameter D1 at the first end thereof where it is engaged to pulley 27 and spur gear 52a. The diameter is reduced at the point where input shaft 25 extends into pump chamber 50 to D2. In the preferred embodiment, D2 is approximately 0.625 in. and D1 is approximately 0.82 in. for a standard application, assuming a 16 HP peak input to each pump 51 and 5 HP input to the auxiliary pump 106'. The proper size of these diameters will depend on the torque needs of the hydraulic pumps and auxiliary pump used with the design and can be readily calculated by one of ordinary skill in the art. Input shaft 25' shown in FIG. 25 differs from input shaft 25 shown in FIG. 6 in the addition of a spline or other engagement means (not shown) to engage auxiliary pump 106'. This arrangement permits the use of a standard size pump 51a, which requires a standard size shaft while still using a larger diameter D1 to drive spur gear 52a. This portion of input shaft 25' having larger diameter D1 extending out of gear cover 41 also permits the use of a much larger auxiliary pump 106 than would otherwise be possible if input shaft had a constant diameter.

While specific, embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A pump apparatus driven by a prime mover, comprising
   (a) a housing having a first side and a second side opposite the first side, said housing comprising a pump chamber;
   (b) first and second hydraulic pumps mounted in said pump chamber;
   (c) a first input shaft drivingly engaged to said first hydraulic pump and having a proximal end extending from said first side of said housing, where said proximal end is driven by said prime mover, and a distal end;
   (d) a second input shaft mounted in said housing and having a proximal end and a distal end, said second input shaft drivingly engaged to said second pump and receiving a motive force from said first input shaft;
   (e) wherein said distal ends of said first input shaft and said second input shaft extend from said second side of said housing;
   (f) a first charge pump engaged to and driven by said distal end of first input shaft and a second charge pump engaged to and driven by said distal end of said second input shaft; and
   (g) an auxiliary pump mounted on said first side of said housing and driven by said first input shaft, wherein said first input shaft has a first portion having a diameter D1 and a second portion having a diameter D2, where D1 is greater than D2, and said auxiliary pump is engaged to and driven by the first portion of said first input shaft and said first hydraulic pump is engaged to and driven by said second portion of said first input shaft.

2. A pump apparatus as set forth in claim 1, further comprising a cooling fan mounted on either said first input shaft or said second input shaft.

3. A pump apparatus as set forth in claim 1, wherein said housing further comprises a gear chamber formed in said housing separate from said pump chamber; and the pump apparatus further comprises a first spur gear mounted in said gear chamber and driven by said first input shaft and a second spur gear mounted on said second input shaft, wherein said second spur gear is driven by said first spur gear.

4. A pump apparatus as set forth in claim 3, wherein said housing is mounted on a vehicle frame, wherein the longitudinal axis of said vehicle frame is perpendicular to said first and second input shafts.

5. A pump apparatus as set forth in claim 3, wherein said housing is mounted on a vehicle frame, wherein the longitudinal axis of said vehicle frame is parallel to said first and second input shafts.

6. A pump apparatus as set forth in claim 3, wherein said pump chamber is segregated from said gear chamber so that hydraulic oil does not flow from said pump chamber to said gear chamber.

7. A pump apparatus as set forth in claim 3, further comprising a bleed formed between said pump chamber and said gear chamber to permit hydraulic oil to flow therebetween.

8. A pump apparatus to be driven by a prime mover, comprising:
   (a) a housing having a top and a bottom, said housing comprising a pump chamber and a gear chamber;
   (b) a first hydraulic pump and a second hydraulic pump mounted in said pump chamber;
   (c) an end cap mounted to the top of said housing and forming a running surface for said hydraulic pumps;
   (d) a first shaft mounted in said housing and having a proximal end and a distal end, and a first portion having a diameter D1 and a second portion having a diameter D2, where D1 is greater than D2, wherein the second portion of said first shaft is engaged to and driving said first pump;
   (e) a second shaft mounted in said housing and having a proximal end and a distal end, said second shaft engaged to and driving said second pump;
   (f) wherein said proximal end of said first shaft extends from said bottom of said housing to receive a motive force from said prime mover and said distal end of at least one of said first shaft and said second shaft extends from the top of said housing;
   (g) a first charge pump mounted on said end cap external to said pump chamber and driven by one of said first or second shafts; and
   (h) an auxiliary pump mounted on the bottom of said housing and driven by the first portion of said first shaft, wherein said auxiliary pump is engaged to and driven by the first portion of said first input shaft.

9. A pump apparatus as set forth in claim 8, wherein said end cap includes hydraulic porting formed therein.

10. A pump apparatus driven by a prime mover, comprising
   (a) a housing comprising a top, a bottom and a plurality of sides connecting the said top and said bottom, and further comprising a pump chamber;
   (b) first and second hydraulic pumps mounted in said pump chamber;
   (c) a first input shaft having a proximal end extending out said bottom of said housing, where said proximal end is driven by said prime mover, and a distal end extending out said top of said housing, wherein said first input shaft has a first portion having a diameter D1 and a second portion having a diameter D2, where D1 is greater than D2, and the first hydraulic pump is driven by the first portion of said first input shaft;
   (d) a second input shaft mounted in said housing and drivingly engaged to said second pump; and
   (e) an auxiliary pump mounted on said bottom of said housing and driven by said second portion of said first input shaft.

11. A pump apparatus as set forth in claim 10, further comprising:
   (a) an end cap forming a part of said housing, said end cap comprising: hydraulic porting for said first and second pumps; an internal running surface for said first and second pumps; and an external surface; and
   (b) a charge pump mounted on said external surface of said end cap and driven by the distal end of said first input shaft.

12. A pump apparatus driven by a prime mover, comprising
   (a) a housing comprising a pump chamber;
   (b) first and second shafts mounted in said housing, wherein the first shaft has a first portion having a diameter D1 and a second portion having a diameter D2, where D1 is greater than D2,
   (c) a first hydraulic pump mounted in said pump chamber and driven by the second portion of the first shaft;
   (d) a first swash plate apparatus mounted in said pump chamber and engaged to said first pump, said first swash plate apparatus comprising a trunnion arm extending out a first side of said housing;
   (e) a second hydraulic pump mounted in said pump chamber and driven by the second shaft;
   (f) a second swash plate apparatus mounted in said pump chamber and engaged to said second pump, said second swash plate apparatus comprising a trunnion arm extending out a second side of said housing, where said second side of said housing is generally parallel to and opposite the first side of said housing; and
   (g) an auxiliary pump mounted on said housing and driven by the first portion of the first shaft.

13. A pump apparatus as set forth in claim 12, further comprising the first input shaft having a proximal end extending out said bottom of said housing, where said proximal end is driven by said prime mover.

14. A pump apparatus as set forth in claim 13, wherein said first input shaft has a distal end extending out said top of said housing, and said pump apparatus further comprises a cooling fan mounted on said distal end of said first input shaft.

15. A pump apparatus as set forth in claim 14, further comprising a charge pump mounted between said housing and said cooling fan, wherein said charge pump is driven by said distal end of said first input shaft.

16. A pump apparatus as set forth in claim 15, further comprising a second charge pump mounted on said housing and driven by said second input shaft.

* * * * *